US011122034B2

(12) United States Patent
Cicchitto

(10) Patent No.: US 11,122,034 B2
(45) Date of Patent: Sep. 14, 2021

(54) METHOD AND APPARATUS FOR AN IDENTITY ASSURANCE SCORE WITH TIES TO AN ID-LESS AND PASSWORD-LESS AUTHENTICATION SYSTEM

(71) Applicant: Nelson A. Cicchitto, San Ramon, CA (US)

(72) Inventor: Nelson A. Cicchitto, San Ramon, CA (US)

(73) Assignee: Nelson A. Cicchitto, San Ramon, CA (US)

( * ) Notice: Subject to any disclaimer, the term of this patent is extended or adjusted under 35 U.S.C. 154(b) by 0 days.

(21) Appl. No.: 15/970,796

(22) Filed: May 3, 2018

(65) Prior Publication Data

US 2018/0255047 A1    Sep. 6, 2018

Related U.S. Application Data

(60) Continuation-in-part of application No. 15/626,997, filed on Jun. 19, 2017, now Pat. No. 9,979,715, which (Continued)

(51) Int. Cl.
*H04L 29/06* (2006.01)
*H04W 12/06* (2021.01)
*H04W 12/68* (2021.01)

(52) U.S. Cl.
CPC ........ *H04L 63/083* (2013.01); *H04L 63/0815* (2013.01); *H04W 12/068* (2021.01); *H04L 2463/082* (2013.01); *H04W 12/68* (2021.01)

(58) Field of Classification Search
CPC ............... H04L 63/083; H04L 63/0815; H04L 2463/082; H04W 12/06; H04W 12/00508; H04W 12/068; H04W 12/68
(Continued)

(56) References Cited

U.S. PATENT DOCUMENTS 7,058,817 B1 *  6/2006  Ellmore ............... G06Q 20/108
                                                                  705/42
7,103,666 B2     9/2006  Royer et al.
(Continued)

FOREIGN PATENT DOCUMENTS

EP        1089516 A3       8/2002

OTHER PUBLICATIONS

Grassi, Paul A., et al., "Digital Identity Guidelines", NIST Special Publication 800-63 Revision 3, Jun. 2017, 1-53.
(Continued)

*Primary Examiner* — Aravind K Moorthy
(74) *Attorney, Agent, or Firm* — Michael A. Glenn; Perkins Coie LLP

(57) ABSTRACT

A technique is provided by which a user goes to a site and instead of the authentication system of the site going to their own databases to match an ID and password given by the user, because doing so is not secure, the site companies makes a call to an identity assurance score server (with ties to the ID-less and password-less system) and send a parameter such as a number. Then, based on that parameter (e.g., number or score), the identity assurance score server (with ties to the ID-less and password-less system, such as described hereinabove) sends a corresponding login protocol or factors to be satisfied to authenticate the user.

17 Claims, 15 Drawing Sheets

Related U.S. Application Data is a division of application No. 15/052,747, filed on Feb. 24, 2016, now Pat. No. 9,686,273.

(60) Provisional application No. 62/120,153, filed on Feb. 24, 2015, provisional application No. 62/501,027, filed on May 3, 2017.

(58) Field of Classification Search
USPC .......................................................... 726/6
See application file for complete search history.

(56) References Cited

U.S. PATENT DOCUMENTS

| | | | |
|---|---|---|---|
| 7,240,364 B1 | 7/2007 | Branscomb et al. | |
| 7,346,923 B2 | 3/2008 | Atkins et al. | |
| 7,490,347 B1* | 2/2009 | Schneider | H04L 63/0815 713/157 |
| 7,536,389 B1 | 5/2009 | Prabhakar et al. | |
| 8,073,810 B2 | 12/2011 | Maes et al. | |
| 8,533,773 B2 | 9/2013 | Maes et al. | |
| 8,589,338 B2 | 11/2013 | Maes et al. | |
| 9,026,592 B1 | 5/2015 | Marra | |
| 9,065,827 B1 | 6/2015 | Taylor et al. | |
| 9,130,910 B1 | 9/2015 | Logue | |
| 9,357,022 B1 | 5/2016 | Chou et al. | |
| 9,363,283 B1* | 6/2016 | Herrera-Yague | G06F 21/50 |
| 9,497,312 B1* | 11/2016 | Johansson | H04L 63/083 |
| 9,628,576 B1 | 4/2017 | Agarwal et al. | |
| 9,645,789 B1* | 5/2017 | Lee | G06F 21/31 |
| 9,749,305 B1* | 8/2017 | Sharifi Mehr | G06F 21/606 |
| 9,801,066 B1* | 10/2017 | Hanley | G06Q 20/405 |
| 9,807,073 B1* | 10/2017 | Miller | H04L 63/08 |
| 10,032,037 B1* | 7/2018 | Allen | G06F 21/57 |
| 10,050,976 B2 | 8/2018 | Disraeli | |
| 10,469,487 B1 | 11/2019 | Griffin et al. | |
| 2002/0087894 A1* | 7/2002 | Foley | H04L 63/083 726/4 |
| 2002/0112183 A1 | 8/2002 | Baird et al. | |
| 2003/0163738 A1 | 8/2003 | Couillard et al. | |
| 2003/0182548 A1* | 9/2003 | Xiong | H04L 12/2859 713/153 |
| 2004/0168059 A1* | 8/2004 | Patrick | G06Q 30/018 713/168 |
| 2005/0204405 A1 | 9/2005 | Wormington et al. | |
| 2005/0238159 A1 | 10/2005 | Halsell et al. | |
| 2006/0075230 A1 | 4/2006 | Baird et al. | |
| 2007/0143860 A1* | 6/2007 | Hardt | H04L 63/105 726/28 |
| 2007/0214494 A1* | 9/2007 | Uruta | G06F 21/608 726/2 |
| 2008/0263632 A1 | 10/2008 | Keon | |
| 2008/0289006 A1 | 11/2008 | Hock et al. | |
| 2009/0017847 A1 | 1/2009 | Mendiola et al. | |
| 2009/0282256 A1 | 11/2009 | Rakic et al. | |
| 2009/0288143 A1 | 11/2009 | Stebila et al. | |
| 2009/0292814 A1 | 11/2009 | Ting et al. | |
| 2009/0292927 A1* | 11/2009 | Wenzel | G06F 21/41 713/185 |
| 2010/0088696 A1 | 4/2010 | Stoev et al. | |
| 2011/0125550 A1 | 5/2011 | Erhart et al. | |
| 2011/0130172 A1 | 6/2011 | Rao | |
| 2011/0153740 A1 | 6/2011 | Smith et al. | |
| 2011/0197287 A1 | 8/2011 | Hess et al. | |
| 2011/0246196 A1 | 10/2011 | Bhaskaran | |
| 2012/0047147 A1 | 2/2012 | Redstone et al. | |
| 2012/0054357 A1* | 3/2012 | Kuritzky | H04L 63/083 709/229 |
| 2012/0072979 A1 | 3/2012 | Cha et al. | |
| 2012/0110072 A1 | 5/2012 | De Villiers | |
| 2012/0215621 A1 | 8/2012 | Heffernan et al. | |
| 2012/0226678 A1 | 9/2012 | Park et al. | |
| 2012/0278241 A1 | 11/2012 | Brown et al. | |
| 2013/0035982 A1 | 2/2013 | Zhang et al. | |
| 2013/0036459 A1 | 2/2013 | Liberman et al. | |
| 2013/0090084 A1 | 4/2013 | Cherubini et al. | |
| 2013/0122934 A1 | 5/2013 | Branch et al. | |
| 2013/0124539 A1 | 5/2013 | Lin et al. | |
| 2013/0179681 A1 | 7/2013 | Benson et al. | |
| 2013/0254283 A1 | 9/2013 | Garcia-Martinez et al. | |
| 2013/0263021 A1 | 10/2013 | Dunn et al. | |
| 2013/0268994 A1* | 10/2013 | Cooper | G06F 21/566 726/1 |
| 2013/0282589 A1 | 10/2013 | Shoup et al. | |
| 2013/0290475 A1 | 10/2013 | Flagg et al. | |
| 2013/0314208 A1 | 11/2013 | Risheq et al. | |
| 2014/0040020 A1 | 2/2014 | Shanmugam et al. | |
| 2014/0047510 A1 | 2/2014 | Belton et al. | |
| 2014/0059029 A1 | 2/2014 | Magill et al. | |
| 2014/0095874 A1 | 4/2014 | Desai et al. | |
| 2014/0123157 A1 | 5/2014 | Keskitalo et al. | |
| 2014/0130159 A1 | 5/2014 | Raman | |
| 2014/0172837 A1 | 6/2014 | Sommer | |
| 2014/0221012 A1 | 8/2014 | Uetabira | |
| 2014/0241519 A1* | 8/2014 | Watson | H04M 3/5175 379/265.06 |
| 2014/0250499 A1 | 9/2014 | Vercruysse | |
| 2014/0258547 A1 | 9/2014 | Scavo et al. | |
| 2014/0273963 A1 | 9/2014 | Su et al. | |
| 2014/0279038 A1 | 9/2014 | Lombard | |
| 2014/0282870 A1 | 9/2014 | Markwordt et al. | |
| 2014/0282977 A1 | 9/2014 | Madhu et al. | |
| 2014/0317689 A1 | 10/2014 | Mogush | |
| 2014/0330651 A1 | 11/2014 | Klemm et al. | |
| 2015/0025980 A1 | 1/2015 | Zaretsky et al. | |
| 2015/0028996 A1 | 1/2015 | Agrafioti et al. | |
| 2015/0046340 A1* | 2/2015 | Dimmick | H04L 63/104 705/72 |
| 2015/0089613 A1 | 3/2015 | Tippett et al. | |
| 2015/0095137 A1 | 4/2015 | Savelli et al. | |
| 2015/0106924 A1 | 4/2015 | Shahbazi | |
| 2015/0113007 A1 | 4/2015 | Hatchard et al. | |
| 2015/0119002 A1 | 4/2015 | Chen et al. | |
| 2015/0124963 A1 | 5/2015 | McCusker et al. | |
| 2015/0127678 A1 | 5/2015 | Alvi et al. | |
| 2015/0134433 A1 | 5/2015 | Muller | |
| 2015/0149373 A1 | 5/2015 | Chhaya et al. | |
| 2015/0149529 A1 | 5/2015 | Loader et al. | |
| 2015/0195295 A1* | 7/2015 | Sandler | G06Q 30/0203 726/26 |
| 2015/0205794 A1 | 7/2015 | Allen et al. | |
| 2015/0245204 A1 | 8/2015 | Heydon | |
| 2015/0261756 A1 | 9/2015 | Klemm et al. | |
| 2015/0264084 A1 | 9/2015 | Kashyap et al. | |
| 2015/0302302 A1 | 10/2015 | Kim et al. | |
| 2015/0304330 A1 | 10/2015 | Soamboonsrup et al. | |
| 2015/0332067 A1 | 11/2015 | Gorod | |
| 2016/0012194 A1 | 1/2016 | Prakash et al. | |
| 2016/0019546 A1* | 1/2016 | Eisen | G06F 21/44 705/44 |
| 2016/0028688 A1* | 1/2016 | Chizhov | H04L 63/029 726/12 |
| 2016/0048662 A1 | 2/2016 | Arnoud et al. | |
| 2016/0050234 A1 | 2/2016 | Choyi et al. | |
| 2016/0070704 A1 | 3/2016 | Yu | |
| 2016/0087957 A1 | 3/2016 | Shah et al. | |
| 2016/0110083 A1 | 4/2016 | Kranendonk et al. | |
| 2016/0112397 A1 | 4/2016 | Mankovskii | |
| 2016/0117328 A1 | 4/2016 | Mondal et al. | |
| 2016/0117355 A1 | 4/2016 | Krishnamurthy | |
| 2016/0132904 A1 | 5/2016 | Mondal et al. | |
| 2016/0134599 A1 | 5/2016 | Ross et al. | |
| 2016/0155089 A1 | 6/2016 | Nakashima et al. | |
| 2016/0164922 A1 | 6/2016 | Boss et al. | |
| 2016/0171513 A1* | 6/2016 | Takeda | G06Q 30/0201 705/7.29 |
| 2016/0173500 A1 | 6/2016 | Sharabi et al. | |
| 2016/0182556 A1 | 6/2016 | Tatourian et al. | |
| 2016/0217489 A1 | 7/2016 | Allard et al. | |
| 2016/0239573 A1 | 8/2016 | Albert et al. | |
| 2016/0285633 A1 | 9/2016 | Allinson et al. | |
| 2016/0328216 A1 | 11/2016 | Leonelli et al. | |
| 2016/0350309 A1 | 12/2016 | Chatterjee et al. | |
| 2016/0366589 A1 | 12/2016 | Jean | |

(56) References Cited

U.S. PATENT DOCUMENTS

| | | |
|---|---|---|
| 2016/0381227 A1 | 12/2016 | Singh et al. |
| 2017/0039476 A1 | 2/2017 | Eyring et al. |
| 2017/0046714 A1* | 2/2017 | Van de Velde ......... G06F 21/34 |
| 2017/0053280 A1 | 2/2017 | Lishok et al. |
| 2017/0064020 A1 | 3/2017 | Dbukhov et al. |
| 2017/0076293 A1 | 3/2017 | Cage et al. |
| 2017/0085568 A1* | 3/2017 | Rolfe ..................... H04L 63/06 |
| 2017/0091289 A1 | 3/2017 | Ohazulike et al. |
| 2017/0093829 A1* | 3/2017 | Gitlin ..................... H04L 63/08 |
| 2017/0099358 A1 | 4/2017 | Perez et al. |
| 2017/0132203 A1* | 5/2017 | Kim ........................ G06F 16/35 |
| 2017/0140643 A1 | 5/2017 | Puppo |
| 2017/0142035 A1 | 5/2017 | Bradley et al. |
| 2017/0154359 A1 | 6/2017 | Zukerman |
| 2017/0161272 A1 | 6/2017 | Tada et al. |
| 2017/0180539 A1 | 6/2017 | Payack |
| 2017/0201520 A1 | 7/2017 | Chandoor et al. |
| 2017/0201550 A1* | 7/2017 | Benson ................... G06F 21/41 |
| 2017/0221156 A1 | 8/2017 | Mingarelli et al. |
| 2017/0277691 A1 | 9/2017 | Agarwal |
| 2017/0300946 A1 | 10/2017 | Wilkinson et al. |
| 2017/0318007 A1 | 11/2017 | Cleeve |
| 2017/0339631 A1 | 11/2017 | Pugaczewski et al. |
| 2017/0353442 A1 | 12/2017 | Burch et al. |
| 2017/0364912 A1* | 12/2017 | Ross ...................... G06Q 20/105 |
| 2017/0374090 A1* | 12/2017 | McGrew ................. G06N 20/00 |
| 2018/0007062 A1* | 1/2018 | Maheshwari ........... G06F 21/45 |
| 2018/0032722 A1 | 2/2018 | Carlson et al. |
| 2018/0048472 A1 | 2/2018 | Pirrwitz et al. |
| 2018/0054467 A1 | 2/2018 | Abou Mahmoud et al. |
| 2018/0089318 A1 | 3/2018 | Chatterjee et al. |
| 2018/0110475 A1 | 4/2018 | Shaya |
| 2018/0114216 A1 | 4/2018 | Joseph et al. |
| 2018/0130002 A1* | 5/2018 | Dekoekkoek .... G06Q 10/06375 |
| 2018/0158061 A1 | 6/2018 | Edelstein et al. |
| 2018/0158100 A1 | 6/2018 | Barak et al. |
| 2018/0196813 A1 | 7/2018 | Lin et al. |
| 2018/0204260 A1 | 7/2018 | McGregor et al. |
| 2018/0218356 A1 | 8/2018 | Grassadonia et al. |
| 2018/0232641 A1 | 8/2018 | Bostick et al. |
| 2018/0262471 A1 | 9/2018 | Pereira et al. |
| 2018/0287883 A1 | 10/2018 | Joshi et al. |
| 2018/0295146 A1 | 10/2018 | Kovega et al. |
| 2018/0324126 A1 | 11/2018 | Grant et al. |
| 2018/0337932 A1 | 11/2018 | Juster et al. |
| 2018/0367526 A1 | 12/2018 | Huang et al. |
| 2019/0034976 A1 | 1/2019 | Hamedi et al. |
| 2019/0042656 A1 | 2/2019 | Germishuys |
| 2019/0052722 A1* | 2/2019 | Gasking ............... G06F 16/9535 |
| 2019/0087746 A1* | 3/2019 | Jain ....................... G06Q 30/016 |
| 2019/0102459 A1 | 4/2019 | Patterson |
| 2019/0108209 A1 | 4/2019 | Ahuja et al. |
| 2019/0109842 A1 | 4/2019 | Kumar et al. |
| 2019/0124023 A1 | 4/2019 | Conroy et al. |
| 2019/0158491 A1* | 5/2019 | Burmester ............ H04L 63/105 |
| 2019/0245871 A1* | 8/2019 | Ward .................. H04L 63/1441 |

OTHER PUBLICATIONS

Grassi, Paul A., et al., "Digital Identity Guidelines", NIST Special Publication 800-63A, Jun. 2017, 1-32.

Grassi, Paul A., et al., "Digital Identity Guidelines", NIST Special Publication 800-63C, Jun. 2017, 1-34.

Grassi, Paul A., et al., "Digital Identity Guidelines", NIST Special Publication 800-63B, Jun. 2017, 1-55.

* cited by examiner

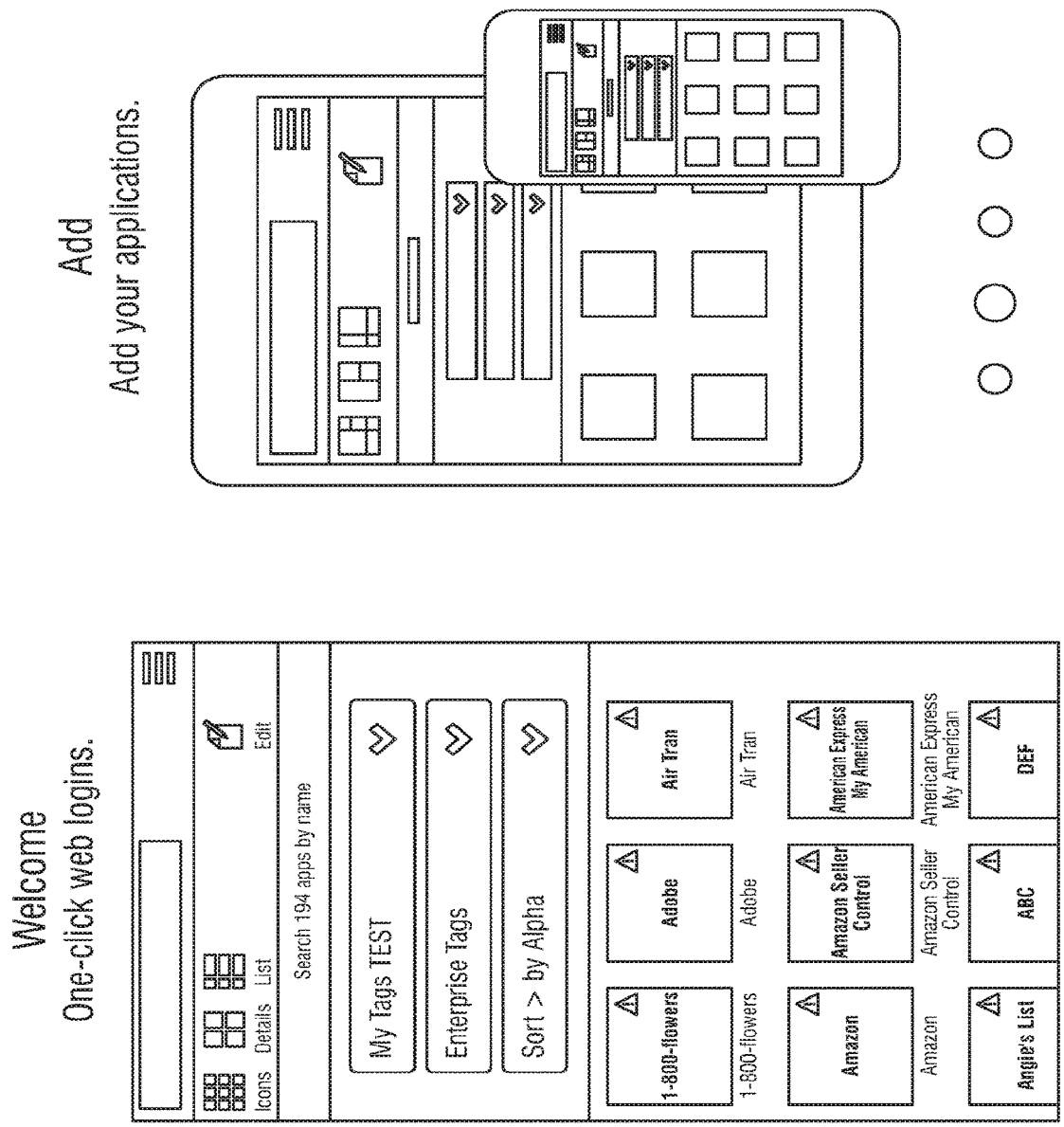

METHOD AND APPARATUS FOR AN IDENTITY ASSURANCE SCORE WITH TIES TO AN ID-LESS AND PASSWORD-LESS AUTHENTICATION SYSTEM

CROSS REFERENCE TO RELATED APPLICATIONS

This patent application is a continuation-in-part of co-pending U.S. patent application Ser. No. 15/626,997, AGGREGATOR TECHNOLOGY WITHOUT USERNAMES AND PASSWORDS, filed Jun. 19, 2017, which is incorporated herein by reference in its entirety, which is a divisional of U.S. patent application Ser. No. 15/052,747 (now U.S. Pat. No. 9,686,273), AGGREGATOR TECHNOLOGY WITHOUT USERNAMES AND PASSWORDS, filed Feb. 24, 2016, which is incorporated herein by reference in its entirety, and additionally claims priority from U.S. Provisional Patent Application No. 62/120,153, SOCIAL SINGLE SIGN-ON AGGREGATOR WITHOUT USERNAMES AND PASSWORDS, filed Feb. 24, 2015, which is also incorporated herein by this reference in its entirety, and this patent application claims priority from U.S. Provisional Patent Application No. 62/501,027, MOBILE DEVICE ENABLED DESKTOP TETHERED AND TETHERLESS AUTHENTICATION AND METHOD AND APPARATUS FOR A SOCIAL NETWORK SCORE AND IDENTITY ASSURANCE SCORE TIES TO ID-LESS AND PASSWORD-LESS AUTHENTICATION SYSTEM, filed May 3, 2017, which is incorporated herein by reference in its entirety.

BACKGROUND OF THE INVENTION

Technical Field

This invention relates generally to the field of digital authentication. More specifically, this invention relates to performing digital authentication based on a generated identity assurance score with ties to an ID-less and password-less authentication system.

Description of the Related Art

Presently, an individual has accounts on many online applications and/or services. These applications and/or services each require the individual to have a user ID and a password as part of their authentication to having access to their account on these applications or services. That individual must maintain knowledge about each of these ID's and passwords to manage their access to each of these accounts and services.

An authentication system and method for offering greater degree of flexibility in using authentication devices while maintaining a high level of security is taught in U.S. Pat. Application No. US 2004/0039909, FLEXIBLE AUTHENTICATION WITH MULTIPLE LEVELS AND FACTORS (Feb. 26, 2004) to D. Cheng. However, the technique is limited to an authorizee requesting the access authorization level.

As well, many organizations rely on technological identity and access management solutions to keep pace with the growth of their organizations, e.g. gaming and hospitality enterprises. Thus, for example, such organizations deploy automated user de-provisioning or password policy enforcement.

In today's environment, partner enterprises allow an external user from one organization outside of their network to have access to an internal application of their organization within their own network. This type of partnership can be referred to as federated identity management. With using federated identity management, an internal application written at Company A can be made publicly available. For a user at Company B on one type of network to access on an entirely different network the internal application written at Company A, the user has to perform the following procedure. The user creates an internal ID at Company A, enters the internal application and maps his external ID from his own network to his internal ID on Company A's network. Further, Company A can allow the user to access their internal application by the user using a social network account, such as a LinkedIn (Mountain View, Calif.; "LinkedIn") account for example. Then, Company A can link the external user's social network account sign on to Company A's internal application.

The technique described above allows Company A to manage their partners' access to their internal applications.

Today, there's a technology known as federation, which allows an enterprise to manage their partners' access to their internal applications. However, federation requires high maintenance for every partner company and a lot of initial effort to set up and configure.

SUMMARY OF THE INVENTION

A technique is provided by which a user goes to a site and instead of the authentication system of the site going to their own databases to match an ID and password given by the user, because doing so is not secure, the site companies makes a call to an identity assurance score server (with ties to the ID-less and password-less system) and send a parameter such as a number. Then, based on that parameter (e.g., number or score), the identity assurance score server (with ties to the ID-less and password-less system, such as described hereinabove) sends a corresponding login protocol or factors to be satisfied to authenticate the user.

BRIEF DESCRIPTION OF THE DRAWINGS

One or more embodiments of the present invention are illustrated by way of example and not limitation in the figures of the accompanying drawings.

FIG. 1 illustrates an example of an interface of a user's page of an aggregator platform, according to an embodiment;

FIG. 9 illustrates an example of a user interface of a delegation page in which a user can enter a delegation type, provider type, provider user name, applicable filters, and a selection of one or more applications to share, according to an embodiment;

FIG. 10 illustrates an example of a user interface showing a sample dropdown list of the provider types of FIG. 9, according to an embodiment;

FIG. 11 illustrates an example of a user interface showing a home page of the aggregator system, according to an embodiment;

FIG. 12 illustrates an example of two different devices, a tablet and a smartphone, each displaying the home page web page of the aggregator system, according to an embodiment;

DETAILED DESCRIPTION

Figure 2:
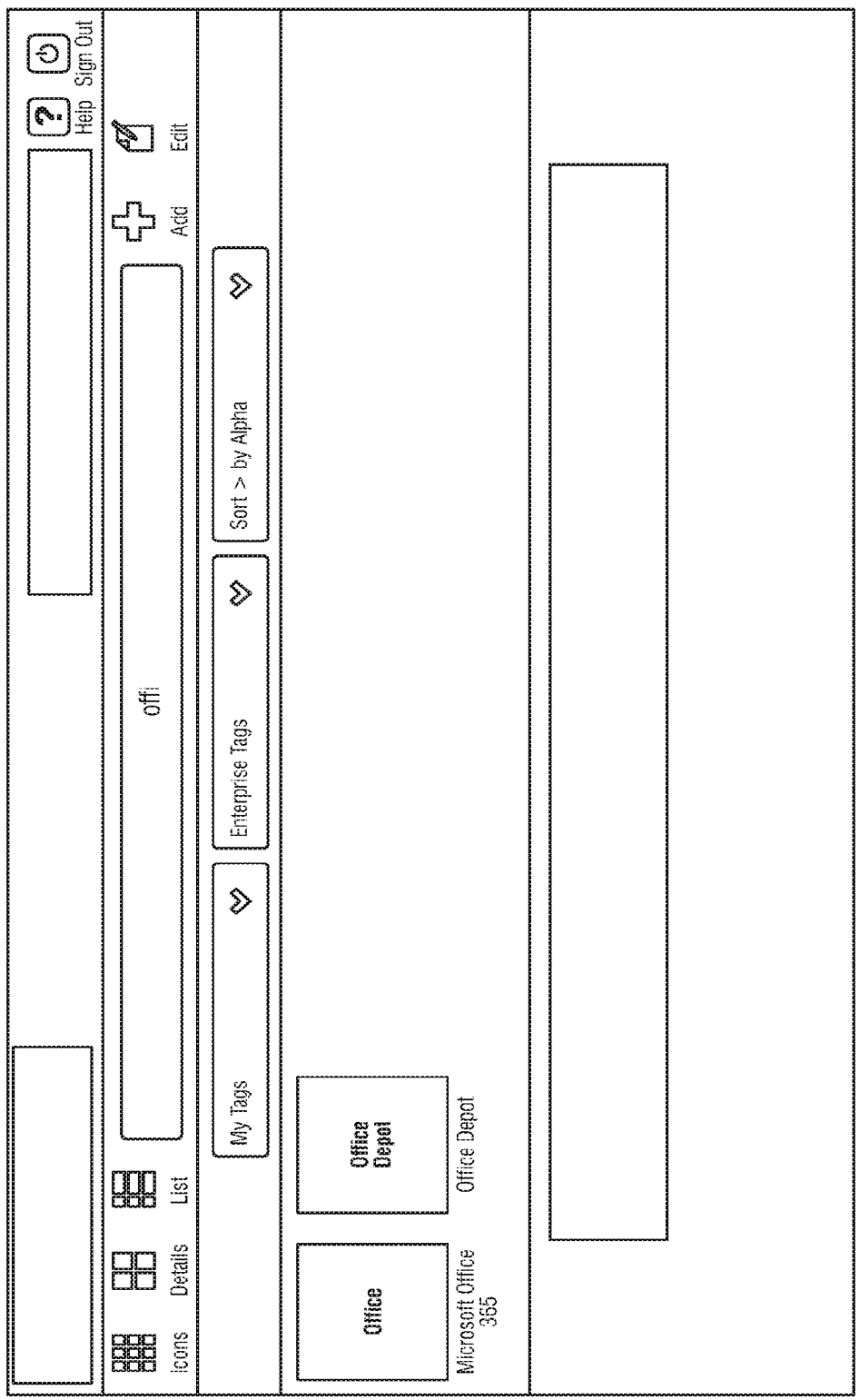
FIG. 2 illustrates an example of a user interface showing two icons representing an enabled application on the aggregator platform and a not-enabled application on the aggregator platform, according to an embodiment.

Introduced here is a technique by which a user goes to a site and instead of the authentication system of the site going to their own databases to match an ID and password given by the user, because doing so is not secure, the site companies makes a call to an identity assurance score server (with ties to the ID-less and password-less system) and send a parameter such as a number. Then, based on that parameter (e.g., number or score), the identity assurance score server (with ties to the ID-less and password-less system, such as described hereinabove) sends a corresponding login protocol or factors to be satisfied to authenticate the user.

Also introduced here is a technique with which to access a user's web applications. The user registers and signs on to an aggregator system using any supported login identity provider username and password. When the user registers for the first time, the system collects additional information to verify the user for a subsequent access to the system. The system also automatically creates an system secret username and secret, highly securely generated password, both of which are unknown and inaccessible to the user. The secret username and password are stored in a lightweight directory access protocol (LDAP) server or database or in a distributed cloud database system. The system also maps the login identity provider user name to the secret user name and password for subsequent usage.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

An Exemplary Embodiment of an Aggregator Platform Without Usernames and Passwords An exemplary embodiment of an aggregator platform without usernames and passwords is a social single sign-on ("sSSO") platform. It should be appreciated that the technique discussed herein can also refer to the aggregator system or application, depending on the context of the discussion. Such platform comprises a server that aggregates a plurality of web applications both internal to an organization and that are public facing to login identity providers including social networking sites such as for example LinkedIn or Facebook (Menlo Park, Calif.; "Facebook"). The platform presents the aggregation of such web applications as links provided to a particular user.

Examples of login identity providers include but are not limited to social networking sites, Linkedin and Facebook. A sample non-exhaustive list can be found in FIG. 4, which is described in further detail below.

Figure 1:
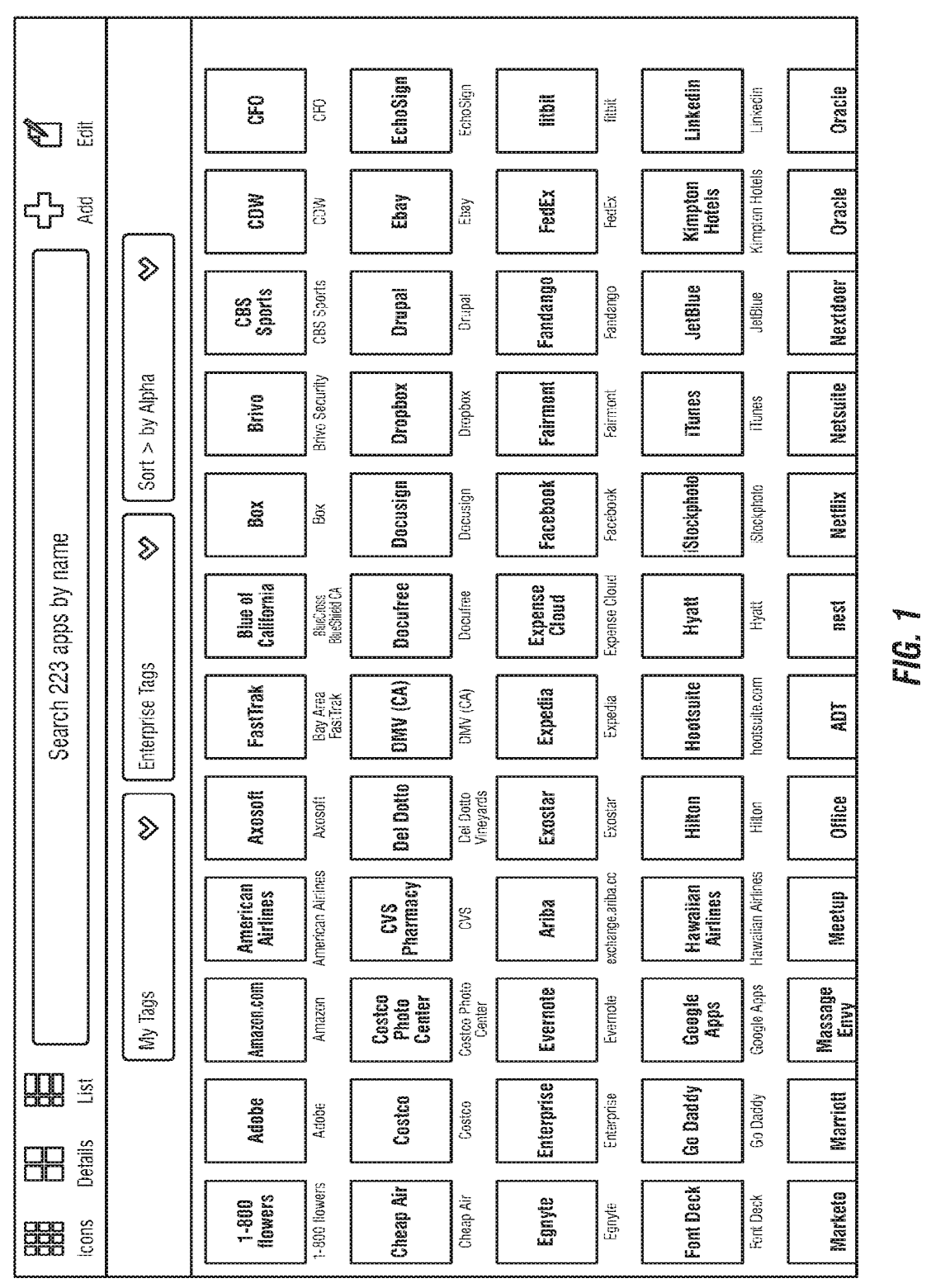

Non-exhaustive examples of web applications that can be aggregated by the server can be found in FIG. 1. FIG. 1 is a sample innovative interface of a user's page on a sSSO application, which displays a collection of web applications which the user had previously added to his sSSO application.

It should be appreciated that the aggregator platform is not limited to the social single sign-on environment. The techniques introduced herein are applicable to aggregators that allow end users to add an application, such that to link to the application at any future time, and from any device, would not need to reenter an ID and/or password. However, employing the social single sign-on implementation of the technique as discussion herein is for purposes of understanding the innovation herein and not for limiting purposes.

To access any of the user's web applications, the user registers and signs on to a social sign-on system ("sSSO") using any supported login identity provider user name and password. For example, the user can register to sSSO using his user name and password that he uses for his Linkedin account. If the user is registering for the first time, the sSSO collects additional information to verify the user later such as for a subsequent access to sSSO. For example, sSSO can collect but is not limited to collecting the user's mobile phone number, questions and answers related to information unique to the user, pictures, biometric data, and/or social information from the identity providers, such as for example information regarding friends, pictures, dates, and conversations. sSSO also automatically creates an sSSO secret user name and a sSSO secret, highly securely generated password. Both such secret user name and secret password are unknown and inaccessible to the user. In an embodiment, this secret user name and secret password are stored in a lightweight directory access protocol (LDAP) server or database or in a distributed cloud database system, etc. sSSO also maps or links the login identity provider user name to the secret user name and password of sSSO system for subsequent usage.

After the user has registered, the user can start using signal sign-on to login automatically to web applications available to the sSSO system. The login identity provider is mapped to the sSSO secret internal user name for purposes of displaying the configured SSO enabled web applications to the appropriate sSSO logged in user. In short, the sSSO secret internal user name is used to display the right apps (web applications) to the right user. Thus, for example, when the user obtains a new, upgraded smartphone, the user does not need to download and reenter the user ID and password for each of his web applications. The user can access any and all of his applications registered in the sSSO from the sSSO application.

FIG. 2 is a sample user interface showing icons representing an enabled and a not enabled SSO application. In this example, the leftmost icon, e.g. Office, represents an SSO enabled application while the icon to the right represents a web application, e.g. Office Depot, that is not enabled. In this example, the sSSO application is configured to display a visual indicator, such as the triangle with the exclamation sign inside, to indicate that such web application is not sSSO enabled.

Figure 3:
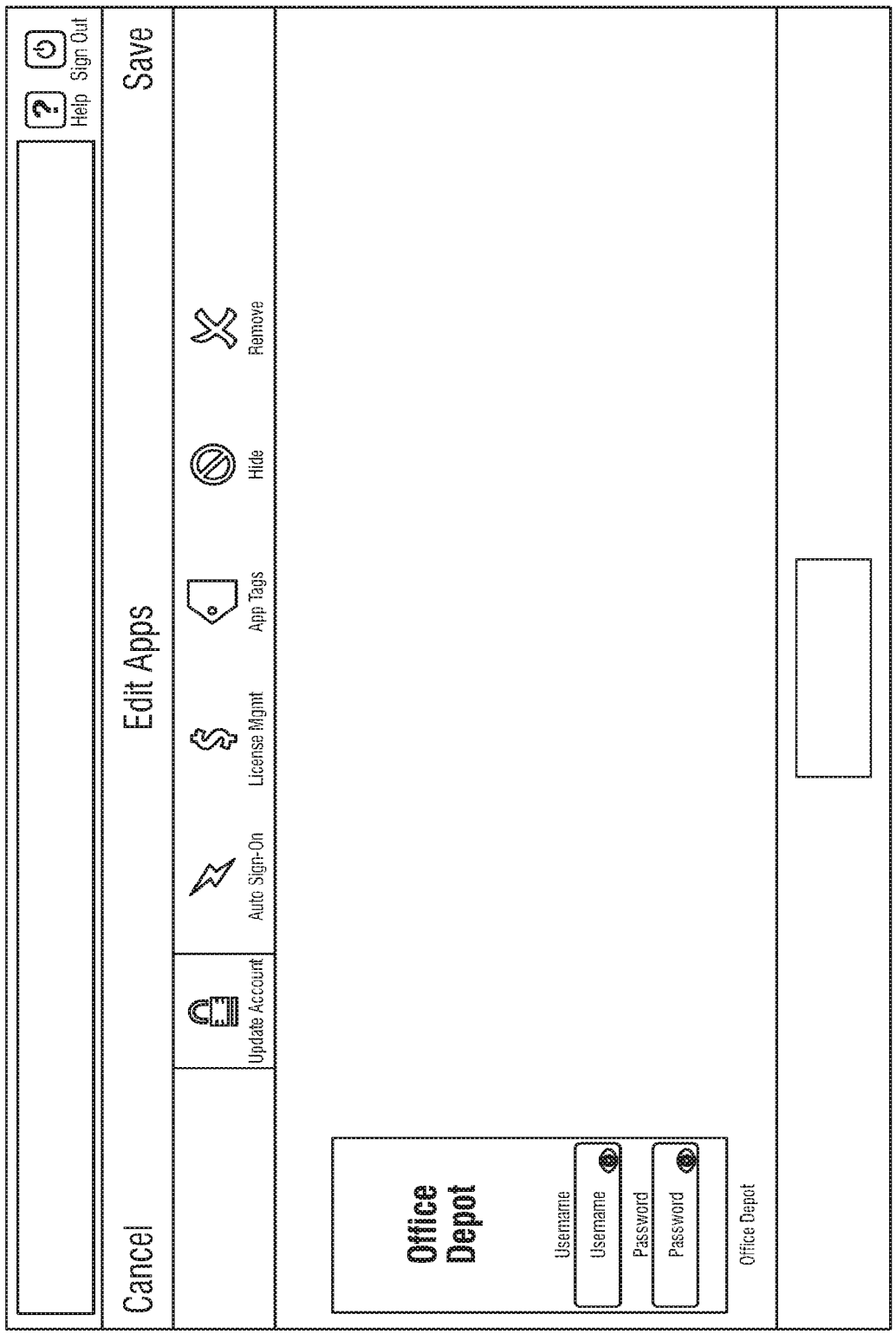
FIG. 3 illustrates an example of a user interface showing a log in graphical user interface (GUI) for a user to add and configure an organization to his aggregator platform, according to an embodiment.

In an embodiment, to enable a web application for sSSO requires entering a user name and optionally a password. An example implementation can be found in FIG. 3. FIG. 3 is a sample user interface of a registration screen to register a particular web application. In the registration screen, a user can enter his or her user name and optionally his or her password for the particular web application.

If the SSO web application, e.g. Office Depot in FIG. 3, is also a login identity provider then sSSO automatically maps or otherwise links the new login identity provider to the sSSO internal secret user name, which enables that login identity provider, e.g. Office Depot, to be used for login in purposes in addition to the existing registered login identity provider, e.g. the original sSSO system. As another example, Facebook and LinkedIn could both be login identity providers to the sSSO system assuming the LinkedIn web application was enabled for single sign-on.

If the sSSO user decides to login using a new unregistered login identity provider, e.g. Facebook, and the user never enabled that login identity provider web application for SSO, the sSSO system will attempt to identify the end user. For example, the sSSO system can go to and use a stored list of usernames and related metadata such as email addresses, actual names, etc., and display candidate selections, e.g. a list of users with similar names from the registered login identity providers, e.g. FACEBOOK: Julie@yahoo.com. That is, the sSSO system prompts the user to pick the login identity provider user name that they recognize. The login identity provider user name can be received by other input means such as for example the user entering his or her user name in a text box, audibly providing the user name, selecting an image that is recognized by the user, providing biometric data such as a finger print, and so on. In addition to using the received user input, the sSSO verifies the identity of the sSSO user by using additional registration information, that is information which was provided by the user when the user registered. For example, such additional registration information can include but is not limited to SMS, Questions/Answers, already registered login identity provider information, biometric information, etc.

Figure 4:
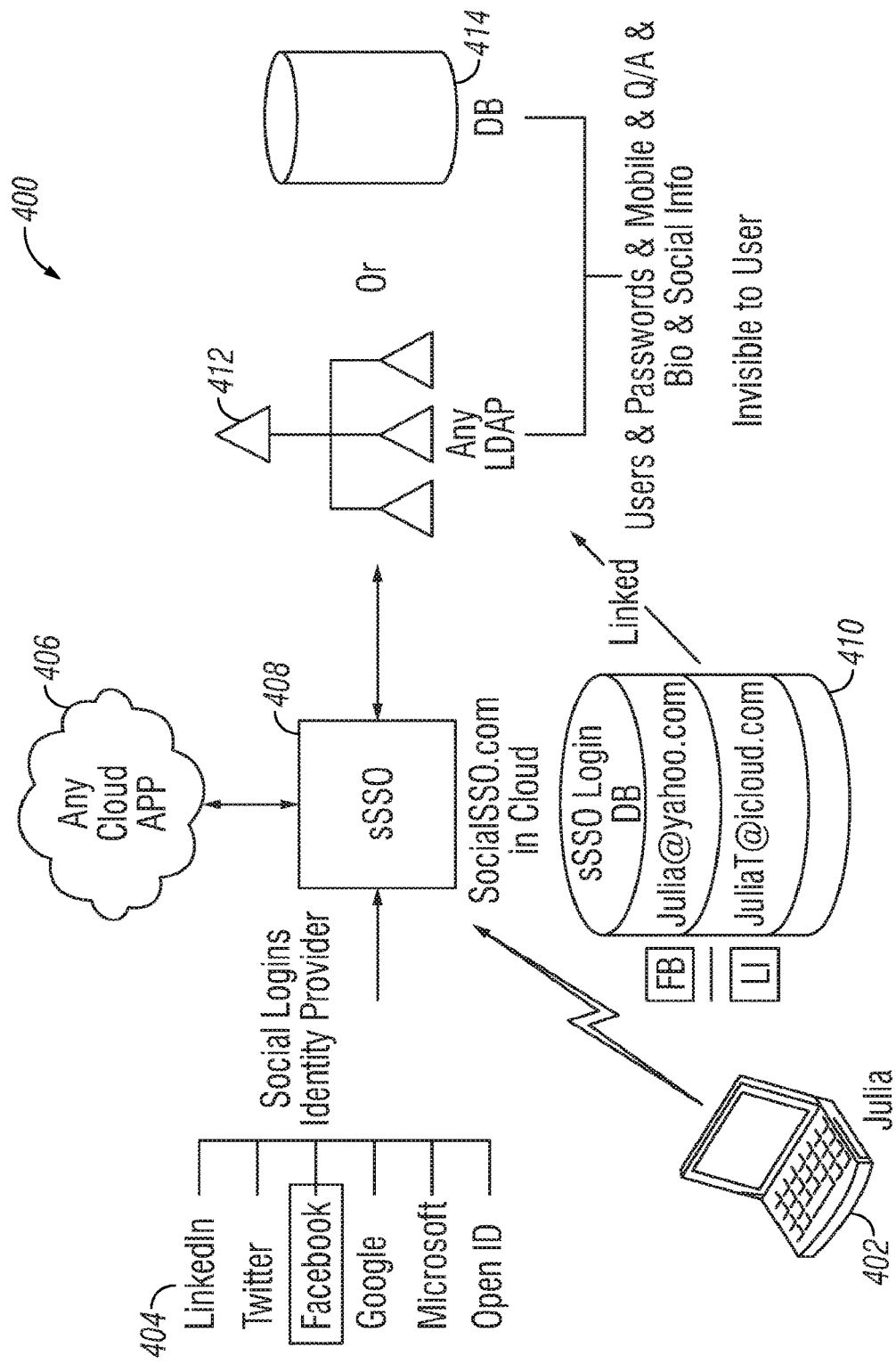
FIG. 4 is a schematic diagram of a system architecture for the aggregator platform, according to an embodiment.

An Exemplary Embodiment of Social Single Sign-On Without Username or Password From a Single Sign-On Provider An embodiment can be understood with reference to FIG. 4. FIG. 4 is a schematic diagram of a system architecture for an aggregator platform, such as for example sSSO, without username or password from the provider, such as for example a SSO provider, 400. A user 402 logs into a social single sign-on (sSSO) application 408, e.g. such as at a website, SocialSSO.com for example, in a network environment such as in a cloud environment. A plurality of social login identity providers 404 are communicably connected with sSSO 408 such that for example a user can log onto sSSO 408 through any of these connected social logins identity providers 404. sSSO 408 is communicably connected to a repository, sSSO login database (DB) 410. In this illustrative example, repository 410 is storing two usernames associated with user 402: Julia@yahoo.com associated with her Facebook account and JuliaT@icloud.com associated with her Linkedin account. sSSO 408 is communicably connected to web applications in the cloud 406. When the user registered with sSSO 408, sSSO 408 requested additional data from the user that could be used in identifying the user at subsequent points in time. Types of such data include but are not limited to user data, passwords, mobile data, questions and answers, biometric data, and social data. sSSO 408 stores such data in a second repository 414 via a distributed directory information service over an Internet Protocol (IP) network 412 such as for example a Lightweight Directory Access Protocol (LDAP) system 412. These user names and other data stored in repository 414 and accessible via service 412 are invisible and inaccessible to the users. Thus, user 402 can login to sSSO 408 using any of her existing social usernames (as shown in repository 410) associated with the respective social login identity provider, which is linked to the user's secret data stored in repository 414. Then, after making the link, sSSO proceeds to verify the user by using any of such data in repository 414, such as for example, asking for a cell phone number or a asking a question and expecting a specific answer that matches a stored answer.

Social Federation Social Single Sign-On

Social Federation social single sign-on ("sFed") can be a system, API, or service that enables an organization such as a company, a university, or a government agency, etc. or end user to easily and securely enable an external party such as a contractor, vendor, alumni, family, friends, etc. access to internal (private) and external (public) web applications without using traditional federation technologies or manually requiring setting up a new user name and password. sFed combined with sSSO easily and securely shares web site login-related data with any user who already has a username and password on a login identity provider website.

Figure 5A:
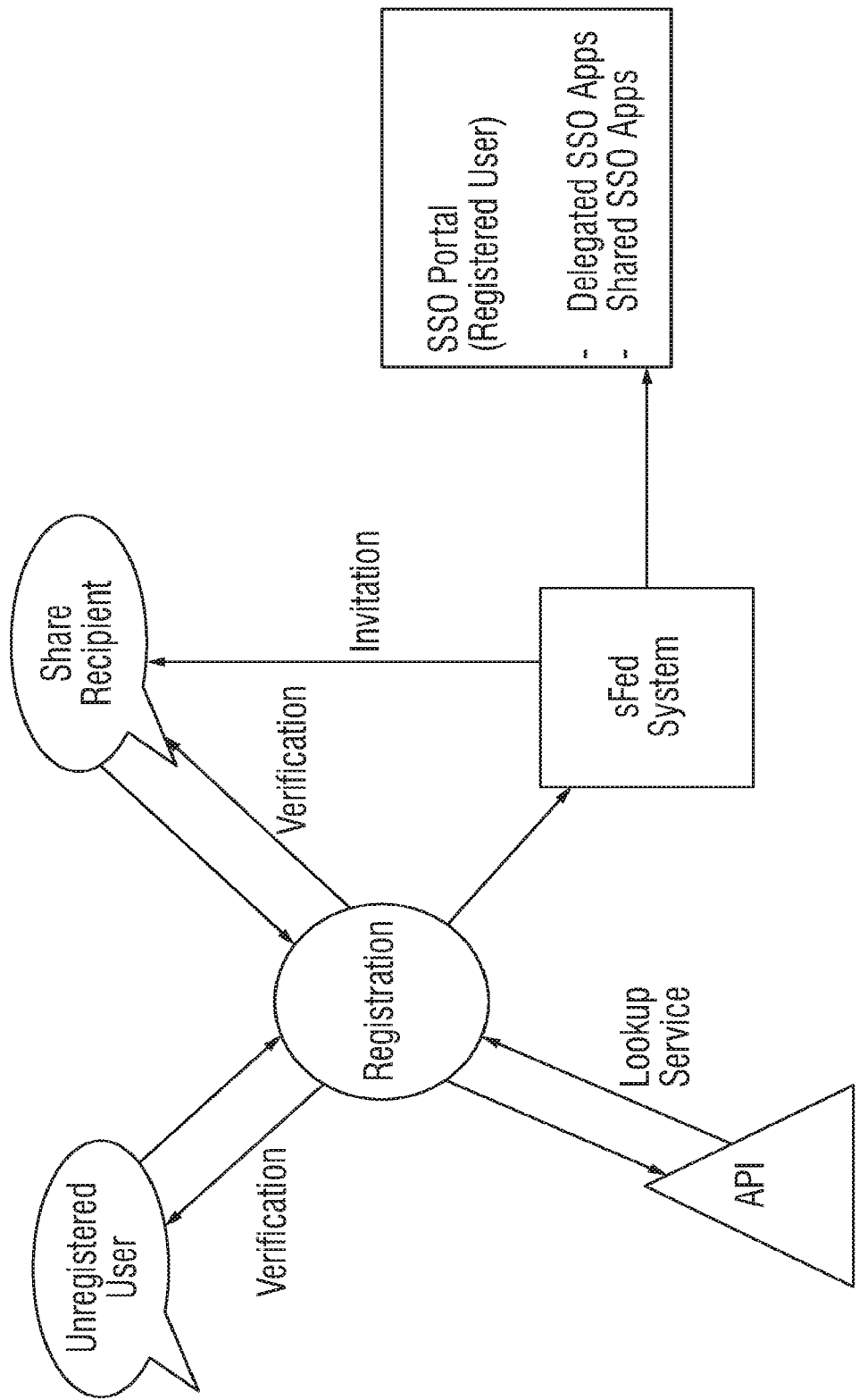
FIG. 5A is a flow diagram of a process for registration to a social federation system, according to an embodiment.

An embodiment of the invention can be understood with reference to FIG. 5A. FIG. 5A is a flow diagram of a process for registration to a social federation system. To use the sFed system requires an external party to register in sSSO or any registered sSSO user to invite an unregistered sSSO user. After they have been registered, the sFed system detects sSSO registration and registered login identity provider user name. Using the sFed system, API, or service, the organization sFed administrator or a sSSO user can delegate (share) sSSO enabled web applications to a registered user or invite an unregistered sSSO user which automatically registers the user into the sSSO system by requiring the invited user to login once to the sSSO system using a login identity provider user name. For example, FACEBOOK: Julie@yahoo.com registers on sSSO and sFed verifies her identity by sending her a SMS token, or question associated with an expected (Q/A), or requiring a biometric confirmation. Thus, in an embodiment, requiring a user to remember and enter login informational data is not needed. sSSO is configured to transmit an alert to the user, where the user can respond with identifying-related data as discussed above.

Figure 5B:
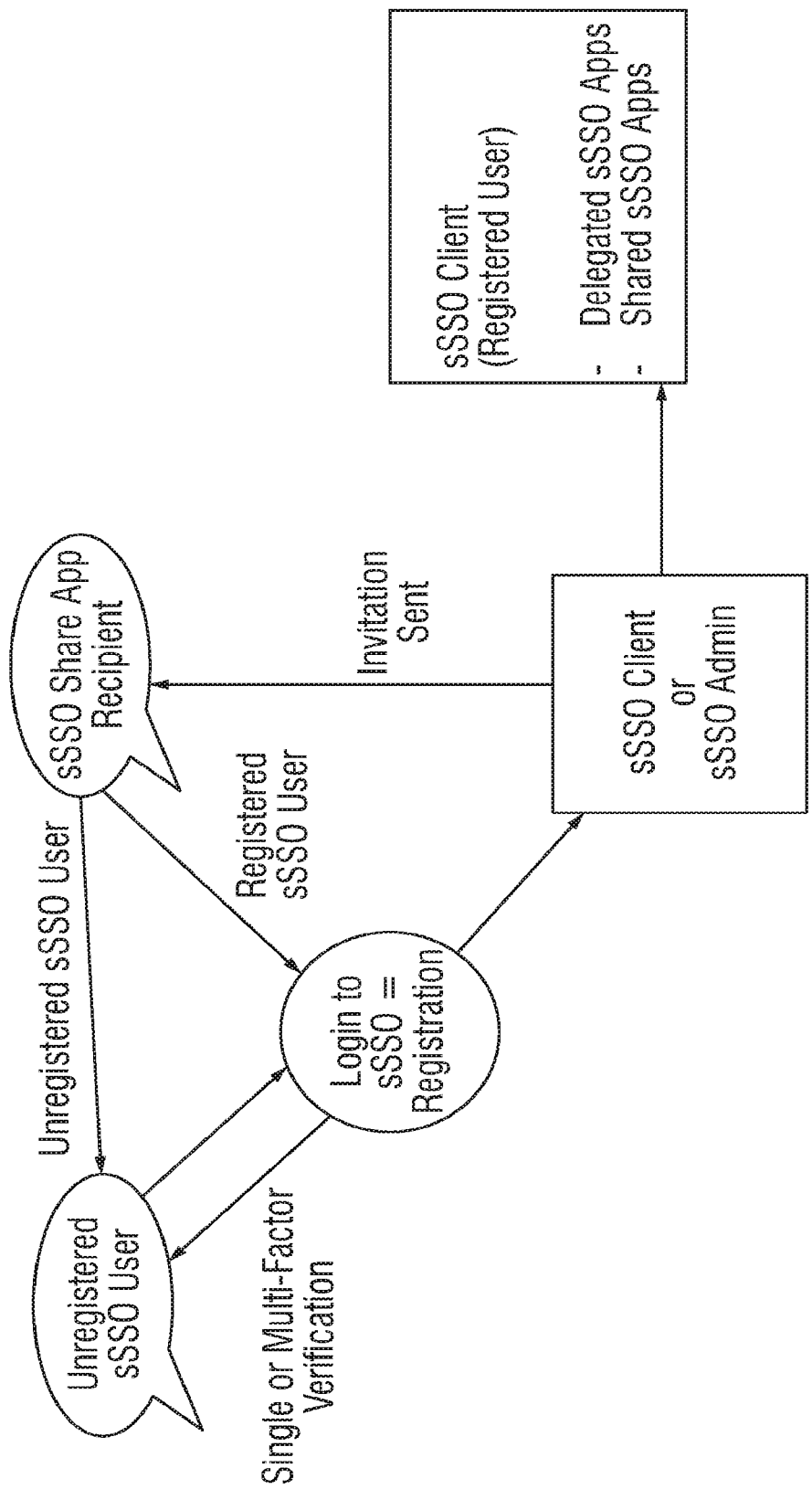
FIG. 5B is a flow diagram of a process for registration to an aggregator system, according to an embodiment.

An embodiment of the invention can be understood with reference to FIG. 5B. FIG. 5B is a process flow for registration to the sSSO system. A user such as an sSSO Client or sSSO Administrator sends an invitation to a recipient, e.g. sSSO Share App Recipient, for the purposes of sharing or delegating an application. If the sSSO recipient is already registered with sSSO, e.g. is a Registered sSSO User, then when such sSSO recipient logs in to sSSO and accepts the invitation, the delegated application is added by the sSSO system to the recipient's collection of sSSO applications. If the sSSO recipient is not yet registered with sSSO, then with the invitation, such recipient is provided the opportunity to register with the sSSO system by providing single or multi-factor verification data. Subsequently, the recipient is a registered sSSO user and the application is added to such user's collection of sSSO applications.

In an embodiment, sSSO enables a user to share login capability along with sharing an application.

Figure 6:
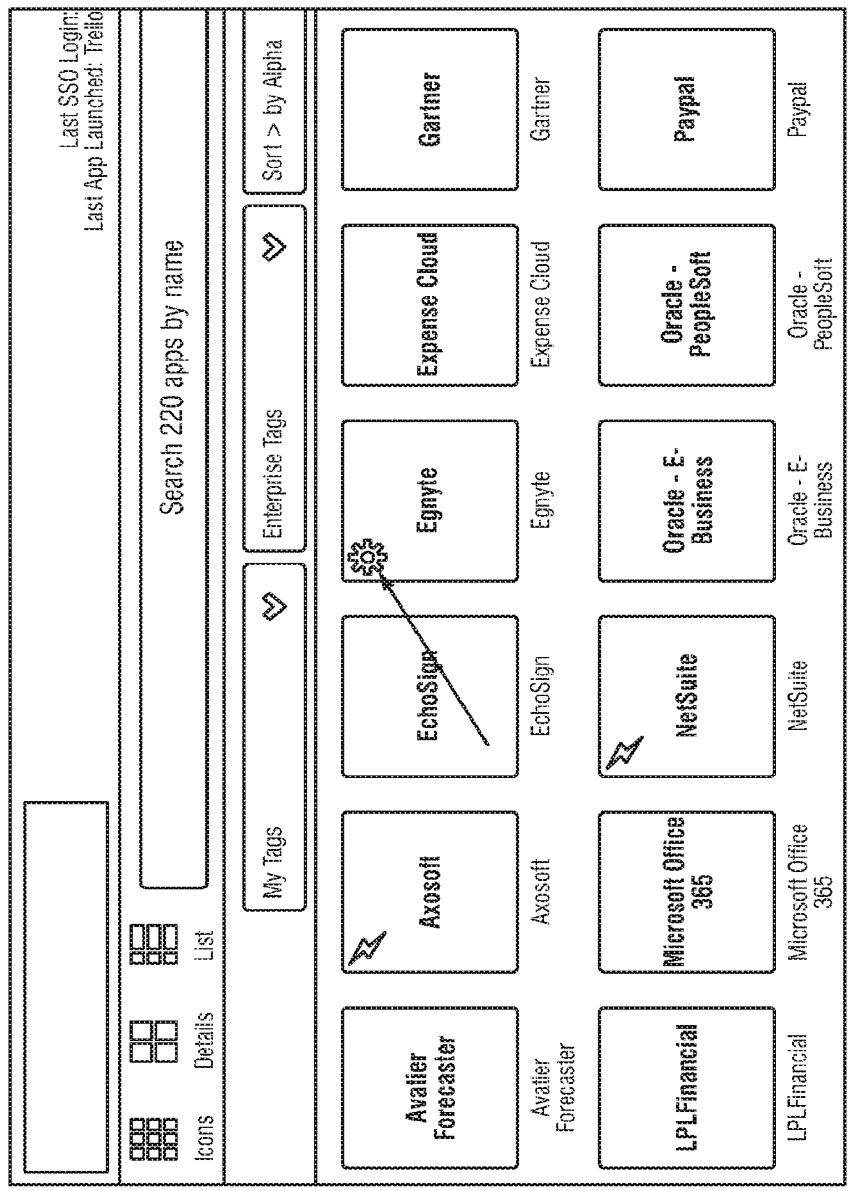
FIG. 6 illustrates an example of a user interface showing an SSO user sharing an application with an unregistered or registered SSO user, according to an embodiment.

FIG. 6 is a sample user interface showing an SSO user sharing an application with an unregistered or registered SSO user. The user initiates the process for the selected SSO application, e.g. Egnyte, by clicking on the icon.

Figure 7:
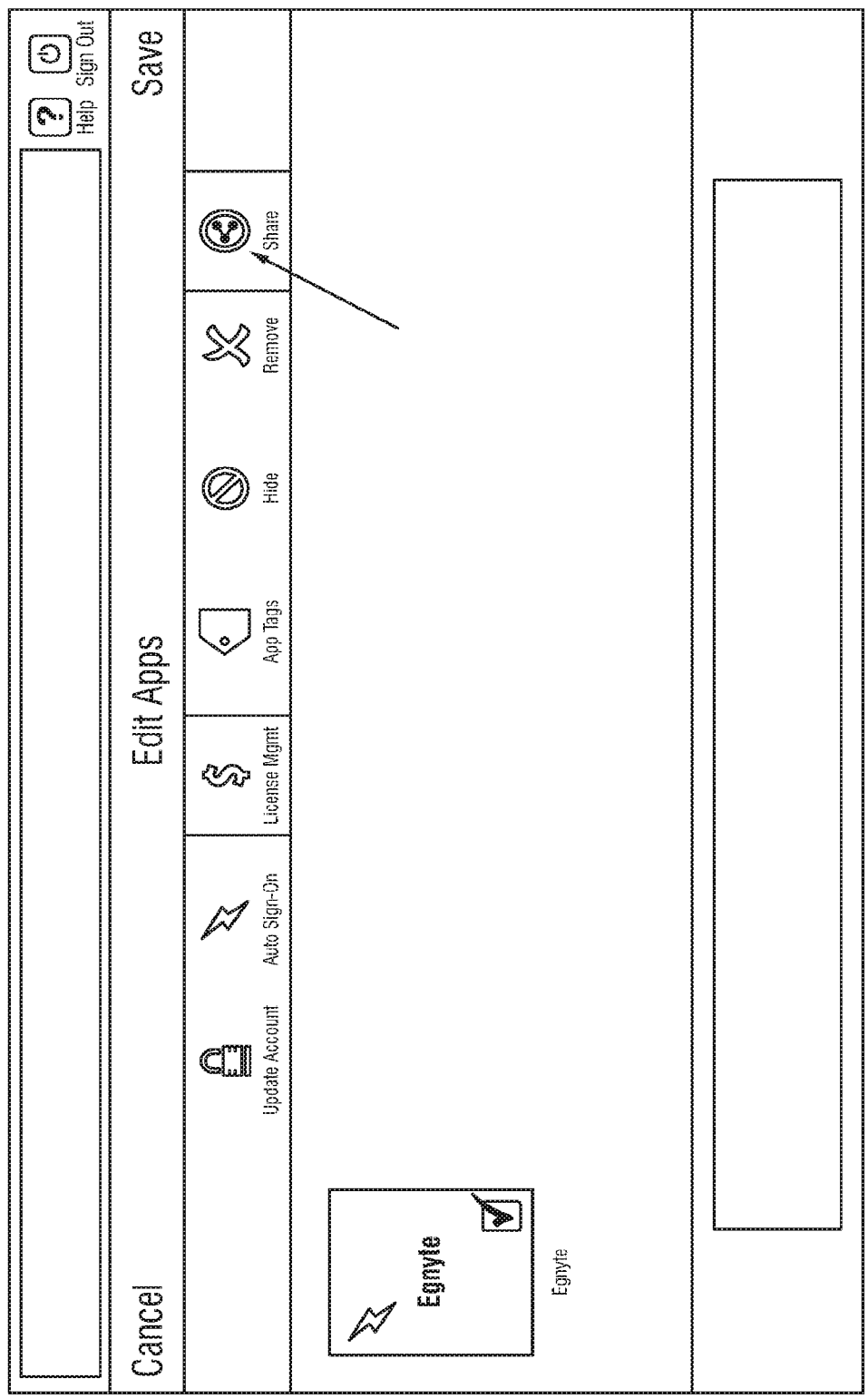
FIG. 7 illustrates an example of a user interface showing a user has selected a Share command to send to a recipient user.

FIG. 7 is a sample user interface showing a user has selected a share command to send to a recipient user. The share command can be sent via multiple methods including but not limited to email, SMS, social network, copying, etc.

Figure 8:
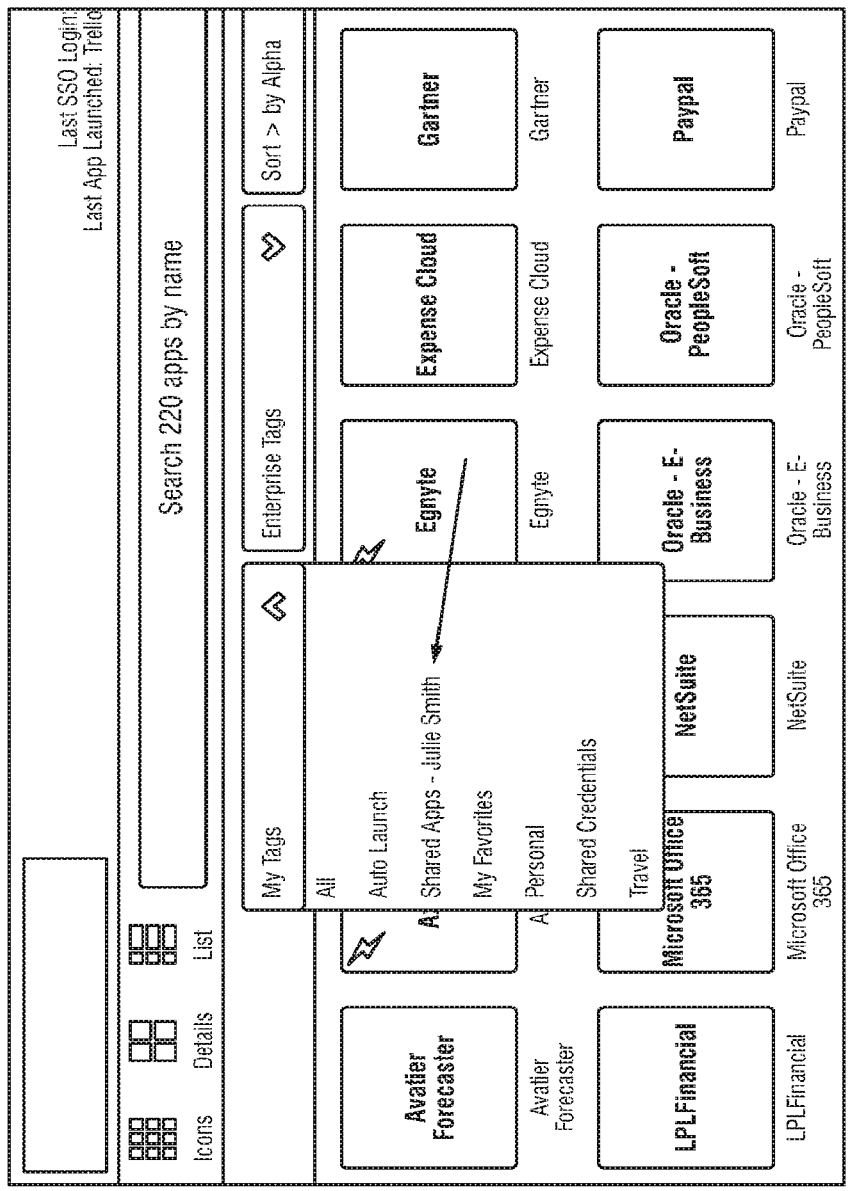
FIG. 8 illustrates an example of a user interface showing how after the SSO user proceeds with registration or log in to SSO, the system provides the user the capability of seeing his shared SSO applications, according to an embodiment.

FIG. 8 is a sample user interface showing how after the SSO user proceeds with registration or login to SSO, they subsequently have capability of seeing or accessing shared SSO applications. For example, the user can access the shared applications by selecting a drop menu that contains a link to a shared apps page. In this example, the system provides a link to shared applications for each recipient.

Figure 9:
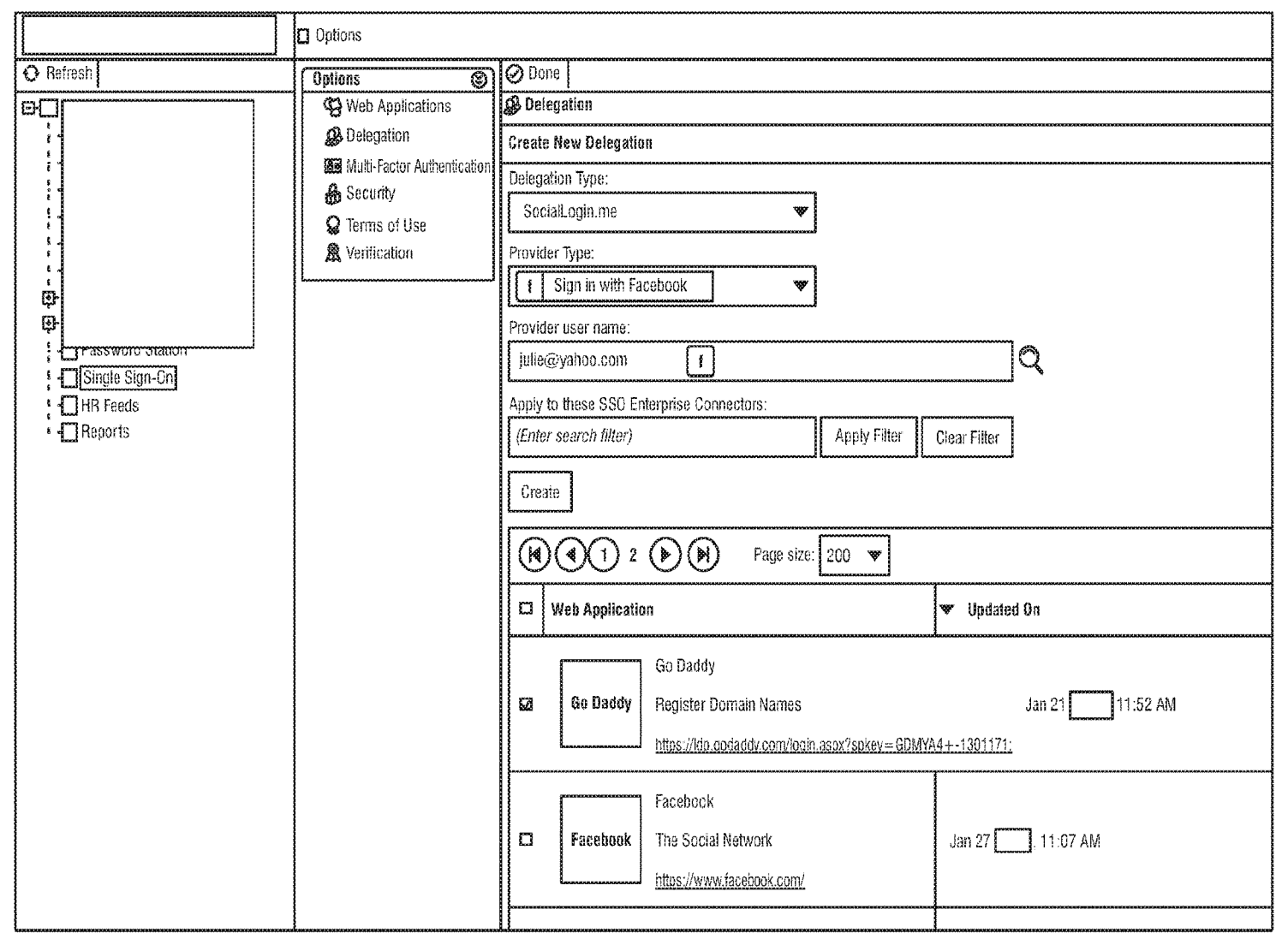

An embodiment provides a sSSO delegation administrator model and corresponding functionality. An administrator can delegate a particular sSSO user to a particular sSSO application, as shown in FIG. 9 for example. FIG. 9 is a sample user interface of a delegation page in which a user can enter a delegation type, e.g. SocialLogin.me, provider type, e.g. Sign in with Facebook, a provider user name, e.g. Julie@yahoo.com, applicable filters, and a selection of one or more applications to share, e.g. Go Daddy.

Figure 10:
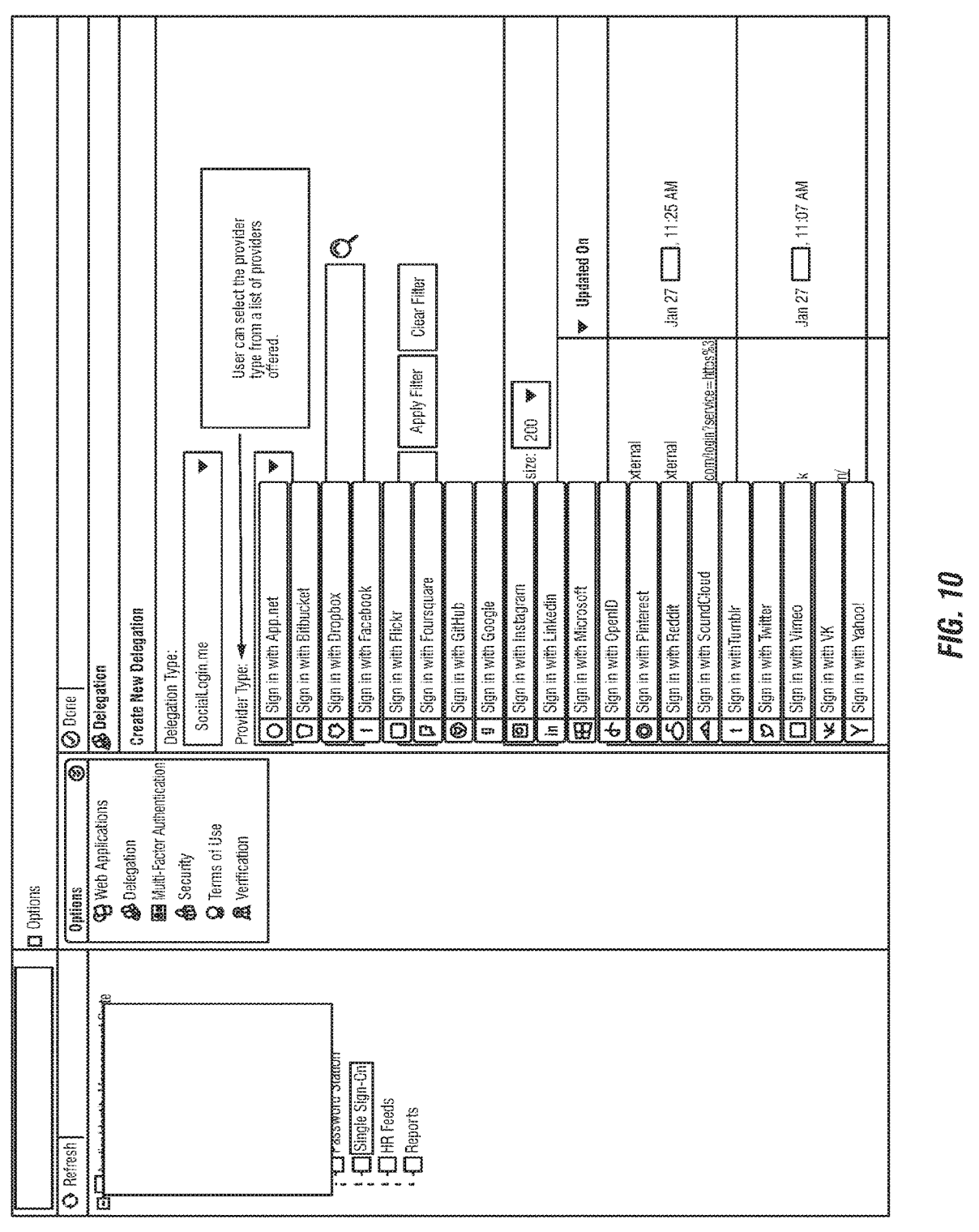

FIG. 10 is a sample user interface showing a non-exhaustive sample dropdown list of the provider types of FIG. 9, each selected type enabling the user to sign in to sSSO and/or sSSO's various enabled web applications or sSSO enterprise connected applications.

If the sFed administrator or sSSO end user is delegating (sharing) a SSO enabled web application, that is using a fixed username and password or a known user name and password to multiple people or shared within the organization to the sSSO user, then system is configured to cause the shared web application to automatically appear on the sSSO users' sSSO interface. For example, sFed uses an API or direct database calls to add the new SSO enabled web application to the user's sSSO interface.

If the sFed administrator is delegating a SSO enabled web application that is using a username and password that is unique to the sSSO user, then sFed automatically creates a user name and password on the enabled web application. For example, sFed can use a format for exchanging authentication and authorization data between parties such as between an identity provider and a service provider, e.g. Security Assertion Markup Language (SAML). Or sFed can use internal methods. Then the SSO enabled web application automatically appears enabled on the sSSO user's sSSO interface.

Web Crawler for Applications Requiring Logons

A technique is introduced by which a web crawler system crawls for web applications that require logons, regardless of content. Each identified web application is added to a database, such as for example the sSSO databases 410 or 414, of such type of applications. In accordance to one technique, the web crawler system discovers a web application and then attempts to logon to the application with a bogus ID and a bogus password. If the attempt is unsuccessful, the web crawler system creates a definition for the web application, where the definition defines attributes of the web application. The web crawler system uses these attributes to categorize the web application within the database. Based on matching the categorization and user profiles, the web crawler system offers the web application to a particular user to add the web application to the user's aggregation of web applications. For instance, the web crawler system can display or send a message to the particular user indicating, "You like bicycles. Perhaps you'd like to add this bicycle application ('bikeapp.com') to your aggregated applications."

Alternate Embodiments

Figure 13:
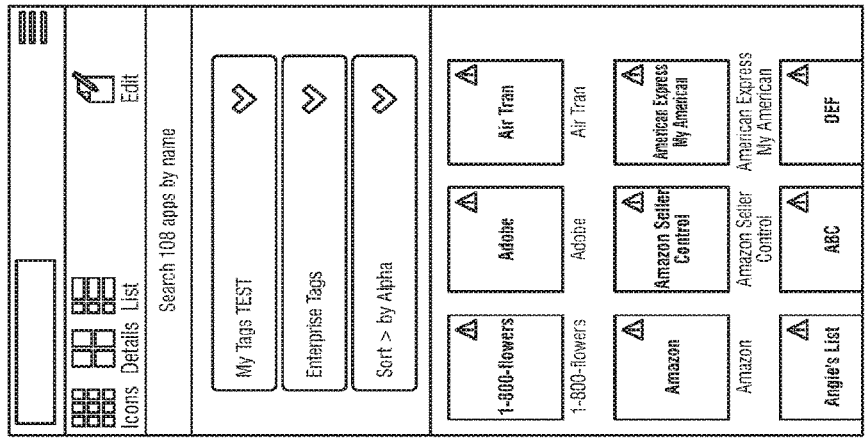
FIG. 13 illustrates an example of a user interface showing four web applications that a user can configure to add to his aggregator system, according to an embodiment.
Figure 14:
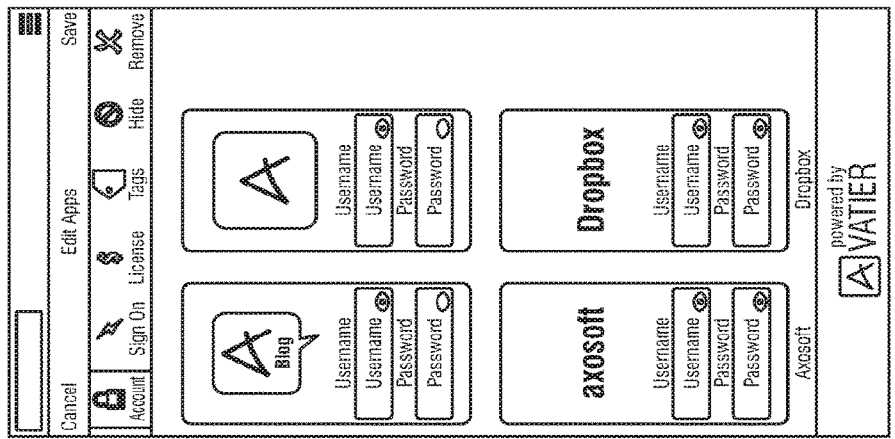
FIG. 14 illustrates an example of a user interface showing icons representing web applications which were added to the system and from which the user can launch with just one click, according to an embodiment.

A smartphone or tablet paradigm or environment illustrates how the innovation solves the technical problem of using computer network resources and bandwidth efficiently by streamlining user interactions with the network. FIG. 11 illustrates an example of a user interface showing a home page of the aggregator system. FIG. 12 illustrates an example of two different devices, a tablet and a smartphone, each displaying the home page web page of the aggregator system. FIG. 13 illustrates an example of a user interface showing four web applications that a user can configure to add to his aggregator system. FIG. 14 illustrates an example of a user interface showing icons representing web applications which were added to the system and from which the user can launch with just one click.

For any new device and in particular for the devices shown, the innovation streamlines user interactions with network, because the user does not need to download and reenter a user ID and password for each of the user's applications. With the technique introduced herein, the user can launch any application already registered in the aggregator platform with a single click, for instance as shown in FIG. 14.

A further efficiency, among others, is afforded the technique introduced here by enabling a user from any device the ability to login with one click to the aggregator system, e.g. as shown in FIG. 11.

A further efficiency is afforded the technique by allowing the user, in addition to launching with one click to a designated application, to add and configure a new application to his already registered applications, as shown in FIGS. 12 and 13.

An Example Machine Overview

Figure 15:
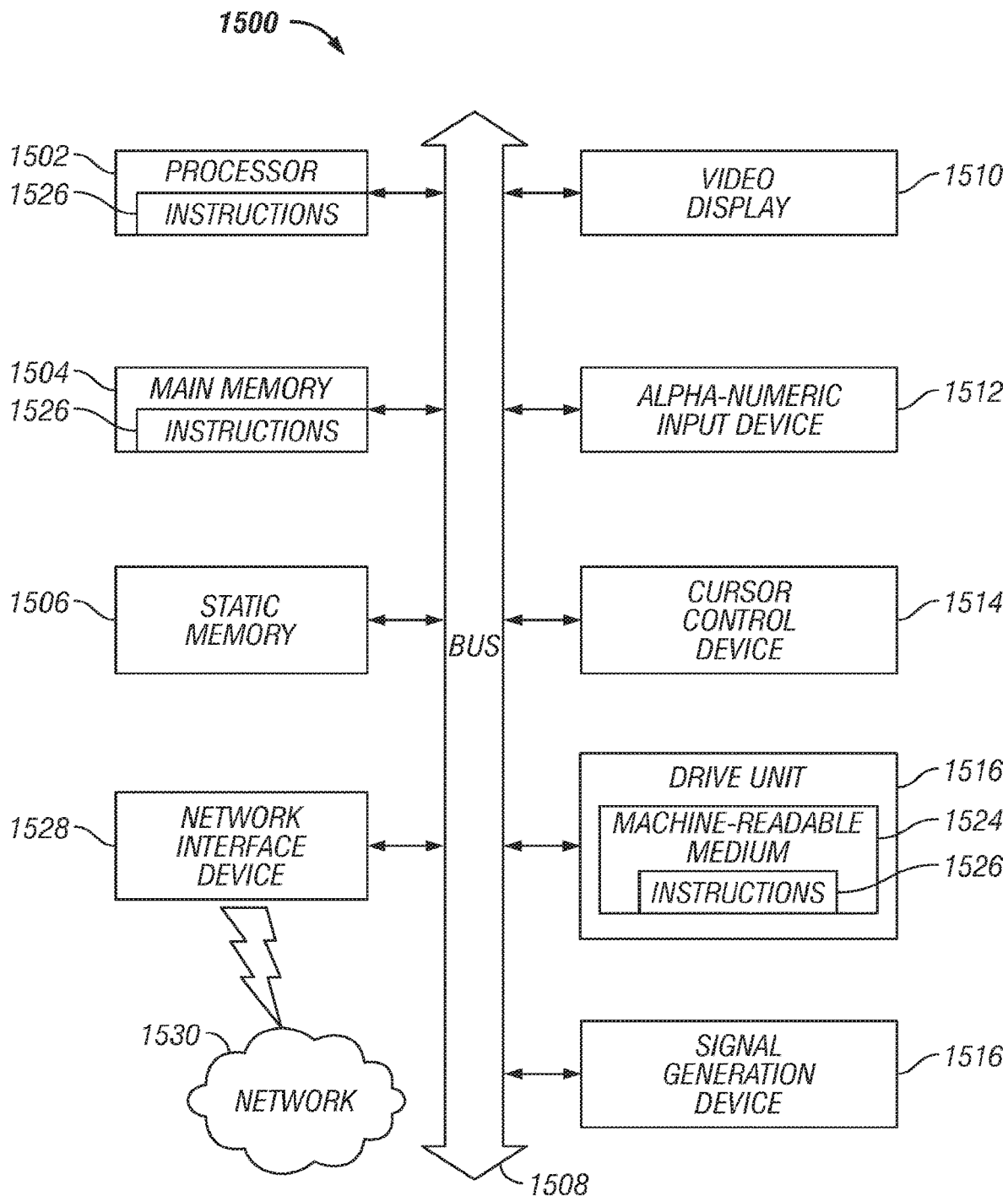
FIG. 15 is a block schematic diagram of a system in the exemplary form of a computer system according to an embodiment.

FIG. 15 is a block schematic diagram of a machine in the exemplary form of a computer system 1500 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 1500 includes a processor 1502, a main memory 1504 and a static memory 1506, which communicate with each other via a bus 1508. The computer system 1500 may further include a display unit 1510, for example, a liquid crystal display (LCD) or a cathode ray tube (CRT). The computer system 1500 also includes an alphanumeric input device 1512, for example, a keyboard; a cursor control device 1514, for example, a mouse; a disk drive unit 1516, a signal generation device 1518, for example, a speaker, and a network interface device 1528.

The disk drive unit 1516 includes a machine-readable medium 1524 on which is stored a set of executable instructions, i.e. software, 1526 embodying any one, or all, of the methodologies described herein below. The software 1526 is also shown to reside, completely or at least partially, within the main memory 1504 and/or within the processor 1502. The software 1526 may further be transmitted or received over a network 1530 by means of a network interface device 1528.

In contrast to the system 1500 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing computations with cloud computing. For the purposes of discussion herein, cloud computing may mean executing algorithms on any network that is accessible by internet-enabled devices, servers, or clients and that do not require complex hardware configurations, e.g. requiring cables, and complex software configurations, e.g. requiring a consultant to install. For example, embodiments may provide one or more cloud computing solutions that enable users, e.g. users on the go, to login to sSSO web applications using social network identity providers or share sSSO web applications anywhere on such internet-enabled devices, servers, or clients. It further should be appreciated that one or more cloud computing embodiments include allowing a user to login to sSSO web applications using social network identity providers or share sSSO web applications using mobile devices, tablets, and the like, as such devices are becoming standard consumer devices.

An Exemplary Identity Assurance Score Ties to Id-Less and Password-Less Authentication System In an embodiment, an identity assurance score can be thought of as a type of credit score, which is familiar to many people these days. For example, the identity assurance score can be a score in the range of zero-10 or zero to 1,000, etc. In an embodiment, this score is associated with a person's identity. Thus, in a system where a user can login without an ID and password, an identity assurance score system and method can be added to that system. Thus, a person's identity assurance score, which is associated with their identity, provides greater assurance to others about who this person is. In an embodiment, communication with the ID-less and password-less system with the identity assurance score server within the system can be achieved using APIs.

In an embodiment, the identity assurance score system is a clearinghouse. For example, a company can configure within the clearinghouse that a user of their services would need a score of 300 to logon, for example. Another company could have configured within the clearinghouse that for a user to logon to use their services, the user would need a score of 500. For instance, the first company could be a company offering entertainment on the Internet. The second company, requiring a higher score, could be a bank offering loans that require greater security and risk as financial information or proprietary information of the bank is shared, presented, or available. Or, the bank could require that the recipient of a bank loan have a score of 700 in order to get the loan. As another example, a blood donation service can require of a person wanting to donate blood a very high score of 900. In an embodiment, identity assurance score server with ties to the ID-less and password-less system can store medical information about the donator, such as blood type. In another example, a gene discovering and identifying company can require that a person applying to get their gene determination results have a high score, such as 1000, in order to use their services. In an embodiment, identity assurance score server with ties to ID-less and password-less system would store the DNA information.

In an embodiment, the data that is asked of the person requesting services and for whom the score has been generated does not have to be limited to irrelevant data. As an example, the data could be a question asking what were the last three houses that you lived in. The system would have previously known that information, because the information associated with a user is stored over time and is cumulative. For example, the housing data could be derived from previous loan applications by the person. As another example, the data asked could be who were your previous two employers. Data could be any information.

In an embodiment, a person does not need to log into systems (that opted-in to this new paradigm) using an ID and a password. The person needs to be authenticated. In an embodiment, a person carries a score with them, so to speak, based on how a person is authenticated. That is, a person has a score, an identity assurance score.

In an embodiment, because a person has authenticated with the system, the system stores factors related to the person. In an embodiment, the score is related to the number of factors asked. For instance, to get a score of 700, the person might be asked seven different things.

In an embodiment, the factors can reflect different dimensions. A dimension is a type of knowledge. For instance, something a person knows, biometric data, or geolocation data are examples of three different dimensions. Thus, the system can be configured to ask and store multi-dimensional forms of multi-factor authentication. For illustrative purposes, a person can be asked three times something he knows. In this case, the person is being asked for three factors that are of the same dimension.

In an embodiment, when a user is required to authenticate by answering three different questions, the system is configured to allow the user to choose which factors he wants to satisfy. For example, the user may choose an SMS message to his phone, to provide a fingerprint biometric, and something else. Or, the company might request voice or eye retina data instead to provide the user access to their system. Thus, a user can choose to satisfy a greater number of smaller level requirements or smaller number of a more complicated or dense requirement, as just illustrated. Thus, to get a particular score does not mean that the system requires the user to perform the same factors. The person can choose which factor or factors he or she wants to satisfy.

As another example, suppose a person wants to login to a grocery store application. The grocery store application presents a login interface to the user. The grocery store knows that it requires a score of, e.g., 100, of the user. Also, the grocery store application makes a call via an API to the identity assurance score server (with ties to the ID-less and password-less system, such as described hereinabove) and because the user only needs a score of 100, the user only gets presented with a screen asking for a login ID and password (reflective of the 100 score). If the user wants to login to a small business application, it might require a score of 200 of the user. Then that small business application makes a call via an API to the identity assurance score server (with ties to the ID-less and password-less system, such as described hereinabove) and causes the person to get presented with a screen(s) requiring the person to enter ID, password, and provide data regarding something the person has or knows. Likewise, if this person goes to a back application, the bank application might require a score of 400 of the person. The bank application makes a call via an API to the identity assurance score server (with ties to the ID-less and password-less system, such as described hereinabove) and because the person needs a score of 400, the user gets presented with a screen(s) asking for ID, password, something the person knows or has, and a biometric identifier such as a fingerprint. In an embodiment and as illustrated in these examples, a user goes to a site and instead of these companies going to their databases to match and ID and password given by the user, because doing so is not secure, these companies make a call to the identity assurance score server (with ties to the ID-less and password-less system, such as described hereinabove) and will send a parameter such as a number. Then, based on that parameter (e.g., number or score), the identity assurance score server (with ties to the ID-less and password-less system, such as described hereinabove) will send a corresponding login protocol or factors to be satisfied.

In an embodiment, the combination of data is the person, the identity of the person. It is not one piece of the data, but any combination of the data and the data keeps changing or growing as the person accumulates life experience.

In an embodiment, the system leverages that much of the information about an individual is available on the Internet and is configured to access such information via API calls.

In a computing environment where the user or device authentication technology does not require usernames and passwords, an embodiment is provided that allows for more robust authentication. An example of such computing environment is described in the co-pending U.S. patent application Ser. No. 15/626,997 ('997), filed Jun. 19, 2017, which is incorporated herein in its entirety by this reference thereto. For example, Company A 212A ("Company A") from FIG. 2 above can have its social single sign on configuration such that when a user attempts to login via a social network service, the ID-less and password-less social SSO provider, or any ID-less and password-less identity provider, can look up in its own database the identity assurance score for this user based on a match of the user with Company A's requirement. The social SSO provider, based on the identity assurance score of the user, can respond to the user requesting further authentication input from the user. For example, a user attempting to log in to Company A's website can get a message saying something like Company A requires your ID, password, and the color of your first car. In the same example, a second user attempting to log in to Company A's website logs in to Company A's website without any further input, because the system determined the user had a preferable (here, low) identity assurance score. In the same example, a third user attempting to log in to Company A's website is determined by the system to have a score such that the user is required to input his ID, password, the color of his first car, and the type of device the user is using.

An example of identity assurance scores and their requirements can be found in Table A. It should be appreciated that this table is for illustrative purposes only and is not meant to be limiting. In an embodiment, the scores reflect cumulative requirements. For example, a score of 100 requires everything required below that score plus what is designated for its score, as can be understood by the example described above. In an embodiment, any score does not have to incorporate requirements of any other score or any score can incorporate requirements of any other score.

An embodiment solves a problem of clogging up the bandwidth due to the system having to incorporate the systems and devices that are specialized in their way up authentication. For example, by using an ID-less and password-less platform such as described in '997, which stores biometric data, the technique described herein does not need to require a fingerprint authentication device and software and hardware for connecting to and using the fingerprint authentication device.

In an embodiment, the identity assurance score is tied to the ID-less and password-less system by using a particular application programming interface (API).

Table A

0—ID No Password
100—ID and Password
150—Something a person knows such as color of first car
200—Something a person has like a phone
250—Social involvement such as no. of connections: 1+5
300—Location
400—Biometric One—e.g., Fingerprint
500—Biometric Two things—e.g., Finger plus Voice
600—Biometric Three things
700—Financial Information
800—Health 1 such as Blood Type or Dental information
900—Health 2, e.g., types of surgeries
1000—DNA

An Exemplary Identity Assurance Score System and Method

Figure 16:
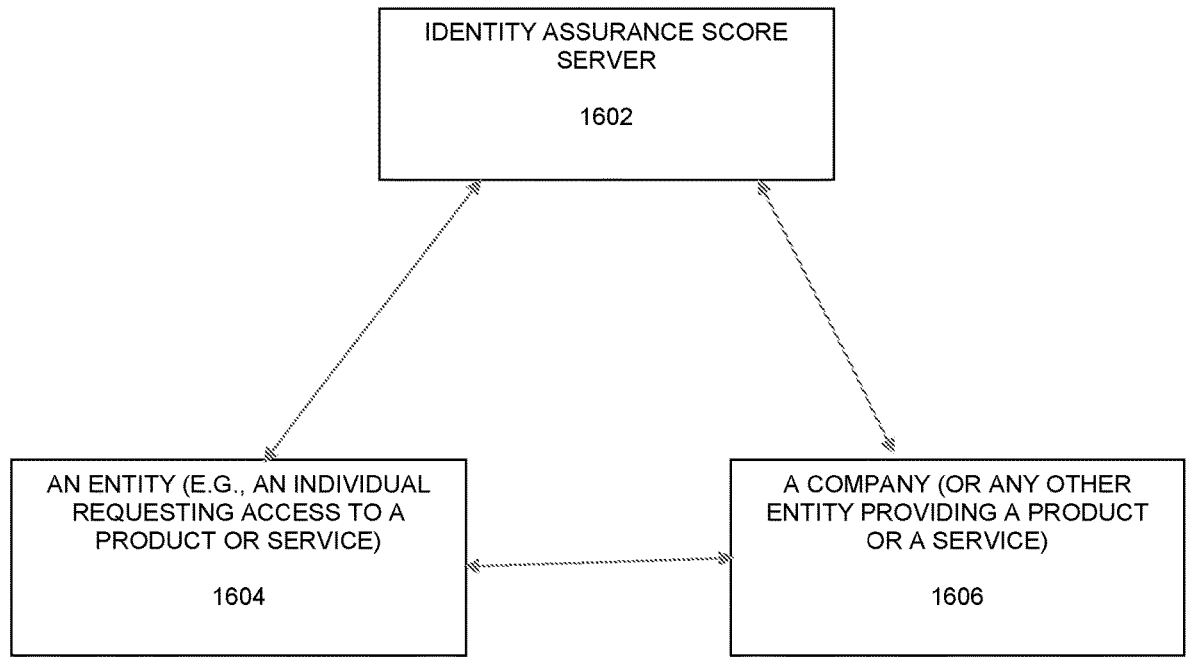
FIG. 16 is a schematic diagram showing the interactions among three parties of an identity assurance score application, according to an embodiment.

An embodiment can be understood with reference to FIG. 16, a schematic diagram showing the interactions among three parties of an identity assurance score application or system. Identity assurance score server 1602 is communicably connected to the company 1606. The company 1606 is communicably connected to an entity 1604. In an embodiment, identity assurance score server 1602 is communicably connected to the entity 1604. The connection can be over the Internet, Intranet, USB, wifi, Bluetooth, and any other communications protocol. In an embodiment, identity assurance score server 1602, the company 1606, and the entity 1604 communicate using APIs.

In an embodiment, the identity assurance server 1602 receives a request initiated from a company server 1606 for an identity assurance score corresponding to an entity 1604 that is requesting the company server 1606 for access to an asset of the company. The asset can be anything, such as for example, access to an online service. The identity assurance score server 1602 generates, in response to the request, the identity assurance score and determines a collection of requirements that the entity must satisfy to access the asset, the collection of requirements based on the generated identity assurance score. It should be appreciated that a different entity (not shown) might be mapped, by the identity assurance score server 1602, to a different score, and thus be required to satisfy a different collection of requirements. Identity assurance score server 1602 transmits to the company server 1606 the identity assurance score and the collection of requirements for the entity 1604 to satisfy. The identity assurance score server receives from the company server 1606, informational data corresponding to the collection of requirements completed by the entity 1604. In this case, company server 1606 conveyed to entity 1604 the collection of requirements that had to be satisfied. And, entity 1604 satisfied such requirements via an online interface over the network or through other means such as via a kiosk at the company premises or in person, for example. Alternatively, entity 1604 and identity assurance score server 1602 can be communicably coupled, where entity 1604 conveys the satisfied requirements via such communication link. The identity assurance server 1602 confirms that the received informational data matches data previously saved on a database at the identity assurance server 1602. Subsequent to confirming that the informational data about the requirements matches the data that is saved, identity assurance score server 1603 notifies the company 1606 that the received information data has been confirmed. From that point on, company 1606 can proceed to fulfill the original request to access to the asset.

An Exemplary Embodiment of an Identity Assurance Score System and Method

In an embodiment, a computer-implemented method (or in alternative embodiments, a system or non-transitory computer-readable medium) is provided, the method comprising: receiving, at an identity assurance server, a first request initiated from a company server for an identity assurance score corresponding to an entity requesting the company server for access to an asset of the company; generating, in response to the request, the identity assurance score and determining a collection of requirements that the entity must satisfy to access the asset, the collection of requirements based on the generated identity assurance score; transmitting by the identity assurance server for delivery to the company server, the identity assurance score and the collection of requirements for the entity to satisfy; receiving, at the identity assurance server and originating from the company server, informational data corresponding to the collection of requirements completed by the entity; confirming, at the identity assurance server, that the received informational data matches data previously saved on a database at the identity assurance server; and notifying the company that the received information data has been confirmed; wherein one or more steps are performed on at least a processor coupled to at least a memory. The exemplary method can further comprise wherein the asset of the company is any of a computer-related account or service or a room or building under control of the company. The exemplary method can further comprise wherein the identity assurance score is based on a predetermined hierarchy of levels of requirements to be satisfied for the request to be approved. The exemplary method can further comprise wherein the requirements of the level are cumulative, meaning that the identity assurance score causes the requirements for the current level and the previous levels to be checked for satisfaction before approving the request. The exemplary method can further comprise wherein the identity assurance score for the current level does not have to incorporate requirements of any other level of any other identity assurance score before approving the request. The exemplary method can further comprise wherein the hierarchy of levels comprises the following levels of requirements for granting access to the asset:

first level—ID of user and No Password;
second level—ID and Password;
third level—Description of something the entity knows;
fourth level—Description of something the entity has;
fifth level—Number of social network connections the entity has;
sixth level—Location of the entity;
seventh level—One biometric identifier;
eighth level—Two biometric identifiers;
ninth level—Three biometric identifiers;
tenth level—Financial information corresponding to the entity;
eleventh level—One health identifier;
twelfth level—Second health identifier; and
thirteenth level—DNA (Deoxyribonucleic acid) of the entity.

The exemplary method can further comprise wherein a biometric identifier is fingerprint or voice of the entity. The exemplary method can further comprise wherein financial information comprises any of: current bank balances; the number of bank accounts; whether the entity is a homeowner; or whether the entity has any personal loans. The exemplary method can further comprise wherein a health identifier is 1 Blood Type; dental information; or type of surgeries.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:
1. A computer-implemented method, comprising:
receiving, at an identity assurance server, a first request initiated from a company server for an identity assurance score corresponding to an entity requesting the company server for access to an asset of the company, wherein the entity is a user and wherein the identity assurance score is computed independently of a device used by the user for requesting access;

generating, in response to the request, the identity assurance score and determining, based on the generated identity assurance score, a collection of requirements that the entity must satisfy to access the asset;

transmitting by the identity assurance server for delivery to the company server, the identity assurance score and the collection of requirements for the entity to satisfy;

receiving, at the identity assurance server and originating from the company server, informational data corresponding to the collection of requirements completed by the entity;

confirming, at the identity assurance server, that the received informational data matches data previously saved on a database at the identity assurance server; and notifying the company that the received information data has been confirmed;

wherein one or more steps are performed on at least a processor coupled to at least a memory; and wherein a hierarchy of levels comprises the following levels of requirements for granting access to the asset:
first level—ID of user and No Password;
second level—ID and Password;
third level—Description of something the entity knows;
fourth level—Description of something the entity has;
fifth level—Number of social network connections the entity has;
sixth level—Location of the entity;
seventh level—One biometric identifier;
eighth level—Two biometric identifiers;
ninth level—Three biometric identifiers;
tenth level—Financial information corresponding to the entity;
eleventh level—One health identifier;
twelfth level—Second health identifier; and
thirteenth level—DNA (Deoxyribonucleic acid) of the entity.

2. The method of claim 1, wherein the asset of the company is any of a computer-related account or service or a room or building under control of the company.

3. The method of claim 1, wherein the identity assurance score is based on a predetermined hierarchy of levels of requirements to be satisfied for the request to be approved.

4. The method of claim 3, wherein the requirements of the level are cumulative, meaning that the identity assurance score causes the requirements for the current level and the previous levels to be checked for satisfaction before approving the request.

5. The method of claim 3, wherein the identity assurance score for the current level does not have to incorporate requirements of any other level of any other identity assurance score before approving the request.

6. The method of claim 1, wherein a biometric identifier is fingerprint or voice of the entity.

7. The method of claim 6, wherein financial information comprises any of: current bank balances; the number of bank accounts; whether the entity is a homeowner; or whether the entity has any personal loans.

8. The method of claim 7, wherein a health identifier is 1 Blood Type; dental information; or type of surgeries.

9. An apparatus, comprising:
a first receiving processor configured to receive, at an identity assurance server, a first request initiated from a company server for an identity assurance score corresponding to an entity requesting the company server for access to an asset of the company, wherein the entity is a user and wherein the identity assurance score is computed independently of a device used by the user for requesting access;

a generating processor configured to generate, in response to the request, the identity assurance score and determine, based on the generated identity assurance score, a collection of requirements that the entity must satisfy to access the asset;

a transmitting processor configured to transmit by the identity assurance server for delivery to the company server, the identity assurance score and the collection of requirements for the entity to satisfy;

a second receiving processor configured to receive, at the identity assurance server and originating from the company server, informational data corresponding to the collection of requirements completed by the entity;

a confirming processor configured to confirm, at the identity assurance server, that the received informational data matches data previously saved on a database at the identity assurance server;

a notifying processor configured to notify the company that the received information data has been confirmed; and at least one memory operable to store computer program instructions a by at least one of said processors;

wherein a hierarchy of levels comprises the following levels of requirements for granting access to the asset:
first level—ID of user and No Password;
second level—ID and Password;
third level—Description of something the entity knows;
fourth level—Description of something the entity has;
fifth level—Number of social network connections the entity has;
sixth level—Location of the entity;
seventh level—One biometric identifier;
eighth level—Two biometric identifiers;
ninth level—Three biometric identifiers;
tenth level—Financial information corresponding to the entity;
eleventh level—One health identifier;
twelfth level—Second health identifier; and
thirteenth level—DNA (Deoxyribonucleic acid) of the entity.

10. The apparatus of claim 9, wherein the asset of the company is any of a computer-related account or service or a room or building under control of the company.

11. The apparatus of claim 9, wherein the identity assurance score is based on a predetermined hierarchy of levels of requirements to be satisfied for the request to be approved.

12. The apparatus of claim 11, wherein the requirements of the level are cumulative, meaning that the identity assurance score causes the requirements for the current level and the previous levels to be checked for satisfaction before approving the request.

13. The apparatus of claim 11, wherein the identity assurance score for the current level does not have to incorporate requirements of any other level of any other identity assurance score before approving the request.

14. The apparatus of claim 9, wherein a biometric identifier is fingerprint or voice of the entity.

15. The apparatus of claim 14, wherein financial information comprises any of: current bank balances; the number of bank accounts; whether the entity is a homeowner; or whether the entity has any personal loans.

16. The apparatus of claim 15, wherein a health identifier is 1 Blood Type; dental information; or type of surgeries.

17. A non-transitory computer readable medium having stored thereon a computer program, said computer program comprising a program code which, when executed by a processor, performs the steps of:

receiving, at an identity assurance server, a first request initiated from a company server for an identity assurance score corresponding to an entity requesting the company server for access to an asset of the company, wherein the entity is a user and wherein the identity assurance score is computed independently of a device used by the user in requesting access;

generating, in response to the request, the identity assurance score and determining, based on the generated identity assurance score, a collection of requirements that the entity must satisfy to access the asset;

transmitting by the identity assurance server for delivery to the company server, the identity assurance score and the collection of requirements for the entity to satisfy;

receiving, at the identity assurance server and originating from the company server, informational data corresponding to the collection of requirements completed by the entity;

confirming, at the identity assurance server, that the received informational data matches data previously saved on a database at the identity assurance server; and notifying the company that the received information data has been confirmed;

wherein a hierarchy of levels comprises the following levels of requirements for granting access to the asset:

first level—ID of user and No Password;

second level—ID and Password;

third level—Description of something the entity knows;

fourth level—Description of something the entity has;

fifth level—Number of social network connections the entity has;

sixth level—Location of the entity;

seventh level—One biometric identifier;

eighth level—Two biometric identifiers;

ninth level—Three biometric identifiers;

tenth level—Financial information corresponding to the entity;

eleventh level—One health identifier;

twelfth level—Second health identifier; and thirteenth level—DNA (Deoxyribonucleic acid) of the entity.

\* \* \* \* \*